(12) United States Patent
Tamagawa

(10) Patent No.: US 8,941,876 B2
(45) Date of Patent: Jan. 27, 2015

(54) INK USE AMOUNT EVALUATION APPARATUS AND METHOD, AND INKJET APPARATUS

(71) Applicant: FUJIFILM Corporation, Tokyo (JP)

(72) Inventor: Kiyomi Tamagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 49 days.

(21) Appl. No.: 13/682,461

(22) Filed: Nov. 20, 2012

(65) Prior Publication Data

US 2013/0128286 A1 May 23, 2013

(30) Foreign Application Priority Data

Nov. 22, 2011 (JP) .................. 2011-255280

(51) Int. Cl.
| | |
|---|---|
| H04N 1/40 | (2006.01) |
| H04N 1/46 | (2006.01) |
| G03F 3/08 | (2006.01) |
| G06K 15/00 | (2006.01) |
| B41J 29/38 | (2006.01) |
| B41J 2/205 | (2006.01) |
| G06K 15/02 | (2006.01) |
| H04N 1/60 | (2006.01) |
| B41J 2/175 | (2006.01) |

(52) U.S. Cl.
CPC ............... *G06K 15/02* (2013.01); *H04N 1/605* (2013.01); *B41J 2/17566* (2013.01)
USPC ............ 358/1.2; 358/448; 358/502; 358/505; 358/523; 358/3.12; 347/12; 347/13; 347/14; 347/15

(58) Field of Classification Search
None
See application file for complete search history.

(56) References Cited

U.S. PATENT DOCUMENTS

| | | | | |
|---|---|---|---|---|
| 2002/0186425 | A1* | 12/2002 | Dufaux et al. | 358/497 |
| 2008/0212897 | A1* | 9/2008 | Le Meur et al. | 382/298 |
| 2009/0262158 | A1* | 10/2009 | Sasayama | 347/14 |
| 2010/0060681 | A1* | 3/2010 | Uchiyama | 347/9 |
| 2010/0290067 | A1* | 11/2010 | Miyake et al. | 358/1.9 |

FOREIGN PATENT DOCUMENTS

JP 2003-039652 A 2/2003

* cited by examiner

*Primary Examiner* — Benny Q Tieu
*Assistant Examiner* — Haris Sabah
(74) *Attorney, Agent, or Firm* — Studebaker & Brackett PC

(57) ABSTRACT

When image is formed by a liquid ejection head, input image data is subjected to conversion processing including tone conversion using a first look-up table (LUT) and density correction or non-uniformity correction in nozzle units using second LUTs. Ink use amount in image formation is predicted from reduced image data which is generated from the input image data. In this, the calculation is made more efficient by applying a third LUT which is compiled according to requirements from the second LUTs, to the reduced image data, rather than using the second LUTs directly. Since the image conversion processing is carried out which combines the first LUT for tone conversion and the third LUT corresponding to the non-uniformity correction, and the ink amount distribution data is calculated from the reduced image data after the conversion, then it is possible to ascertain an accurate ink amount which reflects the image adjustment conditions.

21 Claims, 19 Drawing Sheets

FIG.8

JOB QUEUE

| JOB (ORDER ID) | IMAGE ID | PRINT SIZE | NUMBER OF PRINTS | STATUS |
|---|---|---|---|---|
| 10001 | image01 | B2 | 10 | PRINT STANDBY |
| 10002 | image02 | B2 | 20 | PRINT STANDBY |
| 10003 | image03 | A2 | 20 | PRINT STANDBY |
| 10004 | image04 | A3 | 40 | PRINT STANDBY |
| 10005 | image05 | A2 | 30 | PRINT STANDBY |
| 10006 | image06 | B2 | 20 | PRINT STANDBY |
| 10007 | image07 | B2 | 130 | PRINT STANDBY |
| 10008 | image08 | B2 | 35 | PRINT STANDBY |

JOB QUEUE

OK

| JOB (ORDER ID) | IMAGE ID | PRINT SIZE | NUMBER OF PRINTS | STATUS |
|---|---|---|---|---|
| 10001 | image01 | B2 | 10 | PRINT STANDBY |
| 10003 | image03 | A2 | 20 | PRINT STANDBY |
| 10005 | image05 | A2 | 30 | PRINT STANDBY |
| 10006 | image06 | B2 | 20 | PRINT STANDBY |

NG

| JOB (ORDER ID) | IMAGE ID | PRINT SIZE | NUMBER OF PRINTS | STATUS |
|---|---|---|---|---|
| 10002 | image02 | B2 | 20 | PRINT STANDBY |
| 10004 | image04 | A3 | 40 | PRINT STANDBY |

TONE CONVERSION LUT

INK USE AMOUNT EVALUATION APPARATUS AND METHOD, AND INKJET APPARATUS

BACKGROUND OF THE INVENTION

1. Field of the Invention

The present invention relates to an ink use amount evaluation apparatus, an ink use amount evaluation method and an inkjet apparatus, and more particularly to image signal processing technology suitable for calculating a prediction of an ink use amount when performing image formation (printing) by means of a liquid ejection head based on an inkjet system, and judging whether or not image formation quality is to be affected.

2. Description of the Related Art

When high-density printing is carried out on printing paper using an inkjet printer, the water content in the ink breaks hydrogen bonds between the pulp fibers of the paper, the pulp fibers then expand, and undulation (wrinkling, distortion) of the paper, known as cockling, is produced (see Paragraph 0010 in Japanese Patent Application Publication No. 2003-039652). When paper deformation of this kind occurs, problems occur in that the ink deposition accuracy declines and the paper touches the inkjet head.

Japanese Patent Application Publication No. 2003-039652 proposes a composition in which, in order to prevent decline in print quality, such as paper conveyance errors or decline in image quality, and the like, due to cockling, a total ink use amount is determined by rasterizing input image data and if the determined total ink use amount is greater than a threshold value, then the total ink amount is reduced by using a table (mask data) which causes the total ink amount to become not greater than the threshold value.

Japanese Patent Application Publication No. 2003-039652 describes a method in which the total ink amount is determined from image data for printing by calculating the total ink amount directly from raster data of the image (paragraph 0018), and the method uses fixed conditions for the conversion relationship from the raster data to the total ink amount. However, in an inkjet printer having an adjustment mechanism for tone adjustment and density non-uniformity adjustment (non-uniformity correction), the relationship between the image data and the total ink amount is not uniform and varies depending on the image adjustment conditions which are determined by the tone adjustment and the density non-uniformity adjustment. Consequently, the total ink amount used in image formation increases or decreases depending on the image adjustment conditions, even for the same image data, and hence an accurate ink amount cannot be ascertained with the technology in Japanese Patent Application Publication No. 2003-039652.

SUMMARY OF THE INVENTION

The present invention has been contrived in view of these circumstances, an object thereof being to provide an ink use amount evaluation apparatus, an ink use amount evaluation method and an inkjet apparatus whereby an ink use amount in image formation is identified accurately by reflecting image adjustment conditions, and the presence or absence of effects on image formation quality can be determined accurately.

In order to attain the aforementioned object, the present invention is directed to an ink use amount evaluation apparatus, comprising: an image input device configured to receive original image data; an image reduction processing device which is configured to generate reduced image data from the original image data, the reduced image data having a resolution lower than a resolution of the original image data; a first look-up table storage device which is configured to store a first look-up table specifying an input/output relationship for performing tone conversion of the reduced image data; a second look-up table storage device which is configured to store second look-up tables respectively specifying signal conversion relationships for correcting ink ejection amounts of nozzles in a liquid ejection head which are configured to eject ink in accordance with the original image data; a third look-up table generation device which is configured to generate a third look-up table from the second look-up tables assigned respectively to the nozzles, the third look-up table specifying signal conversion relationships for correcting signal values of the reduced image data for each of prescribed widths corresponding to the resolution of the reduced image data; an image conversion device which is configured to carry out conversion processing using the first and third look-up tables on the reduced image data to generate converted reduced image data; an ink amount distribution data calculation device which is configured to generate ink amount distribution data from the converted reduced image data, the ink amount distribution data indicating a distribution of an ink amount used in image formation of image contents corresponding to the reduced image data; and an image analysis device which is configured to analyze the ink amount distribution data to judge whether an amount of ink exceeding a specific value is to be used or not.

When image contents corresponding to the image data are formed by the liquid ejection head, the input image data is subjected to image conversion processing including tone conversion using a first look-up table (LUT) and density correction in nozzle units (hereinafter referred to as non-uniformity correction) using second LUTs. Ink ejection from each of the nozzles of the liquid ejection head is controlled on the basis of the image data after the image conversion processing, thereby forming an image.

According to this aspect of the present invention, image conversion processing is applied to reduced image data which is generated from the input image data, and the ink use amount in image formation is predicted from the reduced image data after the image conversion. In this, the calculation is made more efficient by applying a third LUT which is compiled according to requirements from the second LUTs, to the reduced image data, rather than using the second LUTs directly. Since the image conversion processing is carried out which combines the first LUT for tone conversion and the third LUT corresponding to the non-uniformity correction, and the ink amount distribution data is calculated from the reduced image data after the conversion, then it is possible to ascertain an accurate ink amount which reflects the image adjustment conditions.

According to this aspect of the present invention, it is possible to calculate an accurate ink use amount which reflects parameter conditions relating to the image adjustment (the first and second LUT conditions), and it is possible accurately to judge whether or not image formation quality will be affected.

Preferably, the third look-up table generation device is configured to compile the second look-up tables assigned respectively to the nozzles for each of the prescribed widths, into the third look-up table.

Preferably, the third look-up table generation device is configured to compile the second look-up tables in a range corresponding to a width per pixel at the resolution of the reduced image data, into the third look-up table.

For example, it is possible to create the third LUT which corresponds to one pixel of the reduced image by averaging the second LUT data corresponding to the width of one pixel in the reduced image data. Alternatively, it is possible to set the LUT having the largest value, of the second LUT data corresponding to the width of one pixel in the reduced image, as the third LUT corresponding to one pixel of the reduced image.

Preferably, the ink use amount evaluation apparatus further comprises: a density information acquisition device which is configured to acquire output density data indicating recording density characteristics for the nozzles in the liquid ejection head; and a second look-up table generation device which is configured to generate the second look-up tables by calculating density correction values for the nozzles, respectively, from the output density data.

It is also possible to generate a new second LUT as necessary, and to update the data to the newest data.

Preferably, when the second look-up table generation device newly generates the second look-up tables, the third look-up table generation device newly generates the third look-up table from the newly generated second look-up tables, and the image conversion device uses the newly generated third look-up table.

According to this aspect of the present invention, the newest parameters are reflected at all times.

Preferably, when the second look-up table generation device newly generates the second look-up tables, the third look-up table generation device newly generates the third look-up table immediately after the newly generated second look-up tables are generated.

According to this aspect of the present invention, the newest parameters are reflected at all times, and the calculation processing time can be shortened Preferably, the ink amount distribution data has a signal bit depth of not smaller than 16 bits.

In order to guarantee the ink amount resolution when calculating the evaluation of the ink use amount by the image analysis device, the depth of the signal of the ink amount distribution data is desirably of a larger number of bits than the depth of the signal of the original input image data (the image data before the image reduction processing).

Preferably, the image analysis device is configured to apply a filter of a size corresponding to a prescribed surface area in an image to the ink amount distribution data and to judge whether the amount of ink exceeding the specific value is to be used or not in the prescribed surface area.

It is possible to use one type or a plurality of types of filter. It is also possible to adopt a composition in which the specific value (threshold value) is set for each type of filter.

Preferably, the ink use amount evaluation apparatus further comprises a display device which is configured to perform a display corresponding to a result of analysis obtained by the image analysis device.

A desirable composition is one in which a user interface (UI) control device for controlling the display in accordance with the ink use amount evaluation results (judgment results) is arranged, and a report, such as a warning, is issued to the operator.

Preferably, the ink use amount evaluation apparatus further comprises an image data storage device which is configured to store image data acquired from the image input device, wherein the display device is configured to perform a display corresponding to a list of images stored in the image data storage device along with a display of an ink use amount status of each of the stored images in accordance with the result of analysis obtained by the image analysis device.

A desirable composition is one in which, in addition to the composition for controlling the display of the user interface, an adjustment device is also arranged in order to adjust the ink amount in such a manner that the ink use amount does not exceed the specific value. The adjustment device may also adopt a mode in which the first LUT is changed, for example.

Preferably, when at least one of the first and second look-up tables is updated, the ink use amount for the stored image is recalculated to reflect this updated look-up table and the display on the display device is updated in accordance with the recalculated result.

It is also preferable that the ink use amount evaluation apparatus further comprises an image data storage device which is configured to store image data acquired from the image input device, wherein the display device is configured to perform a display corresponding to a list of images stored in the image data storage device as sets of classified job groups which are classified in accordance with an ink use amount status of each of the stored images in accordance with the result of analysis obtained by the image analysis device.

Preferably, the ink amount distribution data calculation device is configured to determine an ink amount per pixel in the reduced image data in accordance with a halftone table which specifies a relationship between signal values in the reduced image data and a dot size-specific ratio in a dot arrangement obtained by halftone processing corresponding to the signal values, and information about ink droplet volumes of dot sizes.

Preferably, the image reduction processing device is configured to average pixels of the original image data corresponding to coordinates in a range corresponding to a size per pixel of the reduced image data to specify signal values per pixel of the reduced image data, so as to generate the reduced image data.

It is also preferable that the image reduction processing device is configured to obtain a sum value by summing pixels of the original image data corresponding to coordinates in a range corresponding to a size per pixel of the reduced image data, and to carry out processing for assigning the sum value to any bit depth value of the reduced image data, so as to generate the reduced image data.

Preferably, the reduced image data has a signal bit depth of not smaller than 16 bits.

In order to guarantee the ink amount resolution when calculating the evaluation of the ink use amount by the image analysis device, the depth of the signal of the ink amount distribution data is desirably of a larger number of bits than the depth of the signal of the original input image data (the image data before the image reduction processing).

In order to attain the aforementioned object, the present invention is also directed to an inkjet apparatus, comprising: the above-described ink use amount evaluation apparatus; a medium conveyance device which is configured to move a recording medium relatively to the liquid ejection head; an image processing device which is configured to generate binary or multiple-value data by applying signal processing to inputted image data in accordance with the first and second look-up tables and a halftone table; and an ejection control device which is configured to control ejection from the nozzles of the liquid ejection head in accordance with the data generated by the image processing device.

Preferably, the liquid ejection head is a head based on a single-pass method which records an image by one relative movement with respect to the recording medium.

In order to attain the aforementioned object, the present invention is also directed to an ink use amount evaluation method, comprising: an image input step of acquiring original image data; an image reduction processing step of generating reduced image data from the original image data, the reduced image data having a resolution lower than a resolution of the original image data; a first look-up table storage step of storing a first look-up table specifying an input/output relationship for performing tone conversion of the reduced image data; a second look-up table storage step of storing second look-up tables respectively specifying signal conversion relationships for correcting ink ejection amounts of nozzles in a liquid ejection head which are configured to eject ink in accordance with the original image data; a third look-up table generation step of generating a third look-up table from the second look-up tables assigned respectively to the nozzles, the third look-up table specifying signal conversion relationships for correcting signal values of the reduced image data for each of prescribed widths corresponding to the resolution of the reduced image data; an image conversion step of to carrying out conversion processing using the first and third look-up tables on the reduced image data to generate converted reduced image data; an ink amount distribution data calculation step of generating ink amount distribution data from the converted reduced image data, the ink amount distribution data indicating a distribution of an ink amount used in image formation of image contents corresponding to the reduced image data; and an image analysis step of analyzing the ink amount distribution data to judge whether an amount of ink exceeding a specific value is to be used or not.

The above-described ink use amount evaluation method can also be combined with the characteristics of the above-described modes of the ink use amount evaluation apparatus.

In order to attain the aforementioned object, the present invention is also directed to a computer readable non-transitory medium storing instructions causing a computer to perform the steps of the above-described ink use amount evaluation method.

According to the present invention, it is possible accurately to ascertain the distribution of the ink use amount when forming an image of input image data by a liquid ejection head, and it is possible accurately to judge whether or not print quality will be affected, from the ink use amount evaluation result.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 8 is a diagram showing an example of a list display which is shown on a screen of a monitor;

FIG. 9 is a diagram showing a further example of a list display which is shown on a screen of a monitor;

DESCRIPTION OF THE PREFERRED EMBODIMENTS

<Composition of Inkjet Printing System in Embodiment>

Figure 1:
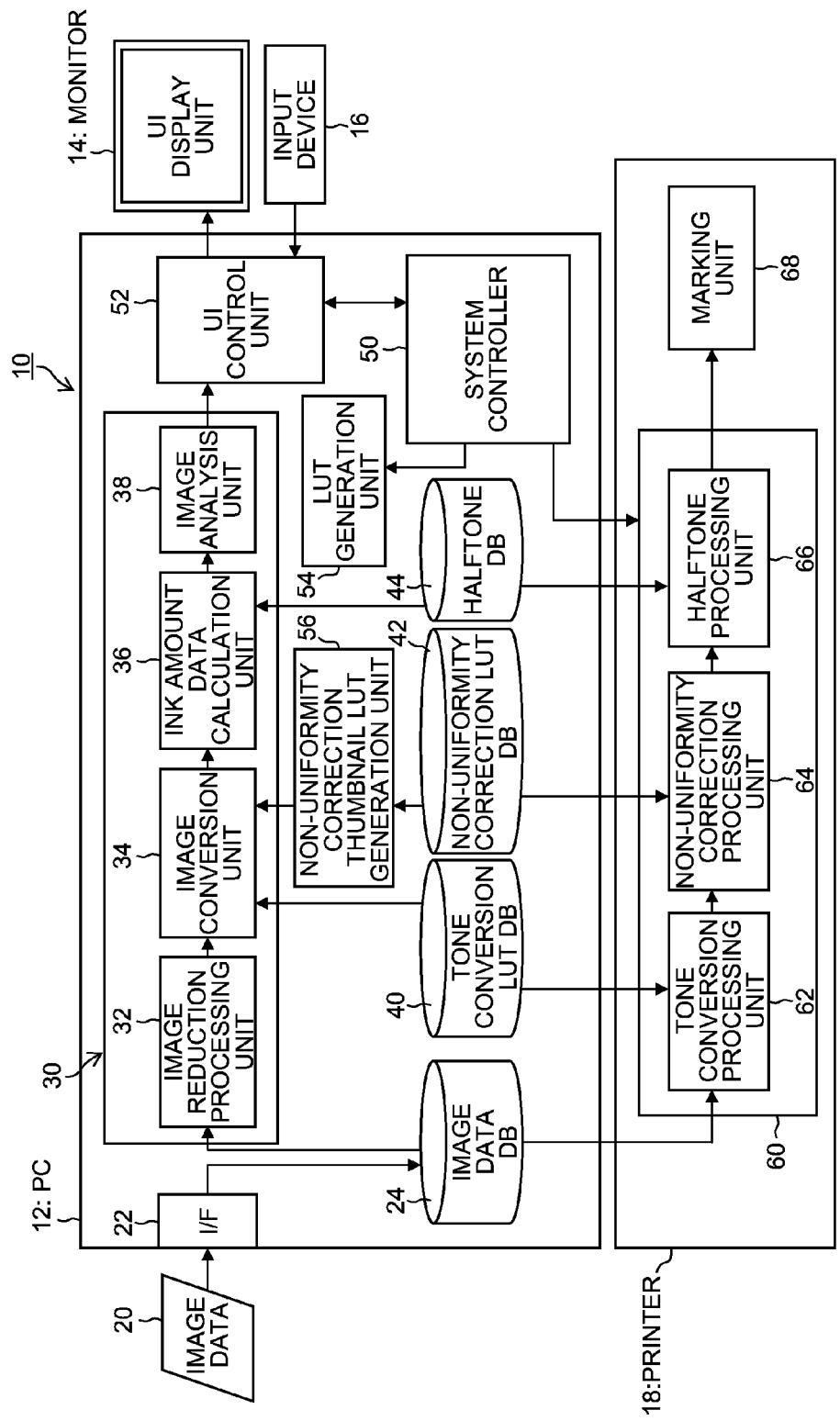
FIG. 1 is a block diagram of the composition of an inkjet printing system according to an embodiment of the present invention.

FIG. 1 is a block diagram showing the composition of an inkjet printing system according to an embodiment of the present invention. The inkjet printing system 10 is constituted of a computer main body (hereinafter referred to as the "computer" or "PC") 12, a monitor 14, an input device 16 and a printer 18. The computer 12 has a function of controlling image data, a function of processing image data, and a function of controlling image processing parameters. More specifically, the computer 12 functions as an image data control unit, an image data processing unit, and an image parameter control unit. Moreover, the computer 12 has a function of controlling the printer 18 and functions as a printer controlling unit.

The monitor 14 and the input device 16 are connected to the computer 12, and the monitor 14 and the input device 16 function as a user interface (UI). The input device 16 can employ a device of various types, such as a keyboard, a mouse, a touch panel, a trackball, and the like, or can use a suitable combination of these. In the present embodiment, a keyboard and a mouse are used as the input device 16. The operator can enter various information through the input device 16, and can operate the printer 18, while looking at information displayed on a screen of the monitor 14. The operator can ascertain (confirm) the state of the system, and the like, through the monitor 14.

The computer 12 includes: an image input interface unit 22 configured to acquire image data 20; a database (hereinafter referred to as an "image data DB") 24, which is an image data storage device configured to store acquired image data; an image data processing unit 30 configured to process image data; a database (hereinafter referred to as a "tone conversion LUT DB") 40 configured to store look-up tables for tone conversion (hereinafter referred to as "tone conversion LUTs"); a database (hereinafter referred to as a "non-uniformity correction LUT DB") 42 configured to store look-up tables for non-uniformity correction (hereinafter referred to as "non-uniformity correction LUTs"); a database (hereinafter referred to as a "halftone DB") 44 configured to store parameters for halftone processing; a system controller 50 configured to execute overall control of the system; and a user interface (UI) control unit 52.

The image data processing unit 30 is configured to carry out an evaluation calculation of the ink use amount. The image data processing unit 30 includes an image reduction processing unit 32, an image conversion unit 34, an ink amount data calculation unit 36, and an image analysis unit 38. The details of the processing in the image data processing unit 30 are described below.

The computer 12 further includes: an LUT generation unit 54 configured to carry out signal processing for generating the non-uniformity correction LUTs from test pattern read results for respective nozzles in an inkjet head; and a non-uniformity correction thumbnail LUT generation unit 56 configured to generate, from the non-uniformity correction LUTs, look-up tables (hereinafter referred to as "non-uniformity correction thumbnail LUTs") used for signal correction corresponding to non-uniformity correction processing for a reduced image generated by the image reduction processing unit 32. The respective units of the computer 12 shown in FIG. 1 (the elements denoted with the reference numerals 22 to 56) can be constituted of the hardware or software of the computer 12, or by a combination of these.

The LUT generation unit 54 generates data such as the tone conversion LUTs, the non-uniformity correction LUTs, and a halftone table, in accordance with a control signal sent from the system controller 50 and/or a command signal (operational signal) sent from the UI control unit 52.

The non-uniformity correction thumbnail LUT generation unit 56 is a calculation unit which generates the non-uniformity correction thumbnail LUTs used in an evaluation calculation of the ink use amount, from the data in the non-uniformity correction LUTs stored in the non-uniformity correction LUT DB 42. The non-uniformity correction thumbnail LUTs thus generated are stored in a memory (not shown) which is referred to by the image conversion unit 34 in the image data processing unit 30.

The system controller 50 in the computer 12 controls calculation by the respective processing units such as the LUT generation unit 54, the non-uniformity correction thumbnail LUT generation unit 56 and the image data processing unit 30, and also implements display control of the monitor 14 and control corresponding to input instructions from the input device 16, in coordination with the UI control unit 52. Furthermore, the system controller 50 sends signals to an image processing board 60 of the printer 18 and controls the operation of the printer 18.

The image input interface unit 22, which functions as an input unit for the image data 20, can employ a wired or wireless communication interface unit, and can employ a media to interface unit which performs reading and writing from and to an external storage medium such as a removable disk, a memory card, or a combination of these.

The image data 20 inputted to the computer 12 through the image input interface unit 22 is stored in the image data DB 24. A chart of image data stored in the image data DB 24 can be displayed on the monitor 14. The operator can instruct whether or not to print object image data, by operating the input device 16 while looking at the display on the monitor 14. With respect to each of the image data stored in the image data DB 24, the operator can instruct print conditions (for example, the paper type, size, number of sheets, color or black and white, color correction, shading correction, and the like) by means of the monitor 14 and the input device 16.

In addition to the items described above, the print conditions include suitable data for respective parameters in the tone conversion LUT DB 40, the non-uniformity correction LUT DB 42, and the halftone DB 44. Suitable data is selected from the databases (40, 42 and 44) in accordance with the instructed conditions, such as the paper type and size, in respect of each item of image data forming the printing object, and print condition data including this information is allocated to each image data.

The image data to be printed is selected from a list of image data stored in the image data DB 24, and when a print execution instruction is given, the image data relating to this selection is transferred from the image data DB 24 in the computer 12 to the printer 18. Furthermore, the parameters corresponding to the print conditions are set in the image processing board 60 in the printer 18.

The printer 18 includes the image processing board 60 configured to carry out signal processing for converting image data received from the computer 12, into a marking signal, and a marking unit 68 configured to execute printing in accordance with the marking signal. The image processing board 60 includes a tone conversion processing unit 62, a non-uniformity correction processing unit 64 and a halftone processing unit 66, and generates the marking signal by subjecting the input image data to tone conversion processing, non-uniformity correction processing and halftone processing. The image data inputted to the image processing board 60 is subjected to processing by the processing units (62, 64 and 66) and is used to form an image by the marking unit 68.

The tone conversion processing unit 62 is configured to carry out processing for to determining the characteristics of the density tones, such as what density of color to use in image formation overall, when forming an image with the marking unit 68. The tone conversion processing unit 62 converts the image data in such a manner that the coloring characteristics specified by the printer 18 (e.g., for four colors of cyan (C), magenta (M), yellow (Y) and black (K)) are achieved. For example, the tone conversion processing unit 62 converts a CMYK signal to a C'M'Y'K' signal, or converts the C signal, the M signal, the Y signal and the K signal respectively to a C' signal, an M' signal, a Y' signal and a K' signal, in accordance with the tone conversion LUT.

The tone conversion processing unit 62 performs the signal conversion while determining the conversion relationship by referring to the look-up table (corresponding to the "first LUT", or the "tone conversion LUT"), which is stored in the tone conversion LUT DB 40 in the computer 12. The plurality of tone conversion LUTs optimized for the respective types of paper (recording media) used for printing are stored in the tone conversion LUT DB 40, and a suitable one of the tone conversion LUTs is referred to in accordance with the type of paper used. The tone conversion LUTs are prepared for the respective colors of inks. In the present embodiment, the tone conversion LUTs are prepared respectively for the colors of C, M, Y and K.

When a print execution instruction is inputted, the tone conversion LUT matching the corresponding print conditions is selected automatically and is set in the tone conversion processing unit 62 of the printer 18. Furthermore, by inputting instructions for selecting, modifying and correcting an LUT, and so on, through the input device 16, it is possible to set up a desired LUT.

The non-uniformity correction processing unit 64 is configured to correct the output density (amount of ejected ink droplet) of each nozzle, in such a manner that the density specified by the tone conversion processing unit 62 becomes a uniform density over the whole surface of the recording medium when ink ejection is carried out by means of the nozzles of the inkjet head constituting the marking unit 68 on the basis of an input signal having a certain constant tone value. The inkjet head has variation in ejection characteristics depending on the nozzles, and hence the ejected droplet volumes are not necessarily uniform. The non-uniformity correction processing unit 64 performs the signal conversion in order to correct, respectively for the nozzles, output density non-uniformities caused by the variations in the ejection characteristics of the respective nozzles. More specifically, the non-uniformity correction processing unit 64 converts the image signal so as to correct the ejection amount of each of the ink ejection nozzles in the inkjet head constituting the marking unit 68, in such a manner that the ink ejection amounts of the nozzles come within a prescribed tolerable range, both within each head and between heads, thereby eliminating color non-uniformities in the plane of the image.

For example, the non-uniformity correction processing unit 64 converts the CMYK signal to a C"M"Y"K" signal, or converts the C' signal, the M' signal, the Y' signal and the K' signal respectively to a C" signal, an M" signal, a Y" signal and a K" signal. The non-uniformity correction processing unit 64 performs the signal conversion while determining the conversion relationship by referring to the look-up table (corresponding to the "second LUT", or the "non-uniformity correction LUT"), which is stored in the non-uniformity correction LUT DB 42 in the computer 12. The plurality of non-uniformity correction LUTs optimized for the respective types of paper (recording media) used for printing are stored in the non-uniformity correction LUT DB 42, and a suitable one of the non-uniformity correction LUTs is referred to in accordance with the type of paper used.

The halftone processing unit 66 converts the image signal having multiple tones (for example, 256 tones based on 8 bits per color), for each pixel, into a binary signal which indicates ink ejection or no ink ejection, or into a multiple-value signal indicating what type of droplet to eject, if a plurality of ink dot diameters (droplet sizes) can be selected. In general, processing is carried out to convert the multiple-tone image data having M values (where M is an integer not smaller than 3) into data having N values (where N is an integer smaller than M and not smaller than 2). The halftone processing can employ a dithering method, error diffusion method, density pattern method, or the like.

The marking unit 68 in the present embodiment can selectively eject droplets of three types in size: a large droplet, a medium droplet and a small droplet. In this case, the halftone processing unit 66 converts the multiple-tone data (for example, of 256 tones) after the non-uniformity correction processing, into a signal of four values, namely: "ejecting ink of a large droplet", "ejecting ink of a medium droplet", "ejecting ink of a small droplet" and "ejecting no ink". The conversion relationship employed in the signal conversion in the halftone processing unit 66 is determined by referring to the halftone table stored in the halftone DB 44 of the computer 12.

The halftone table specifies a ratio in which dots of the respective sizes (large/medium/small) are used per unit surface area, a dot ratio of the respective dot sizes (dot size-specific ratio) being specified in accordance with the magnitude of the input signal. The halftone table DB 44 stores the halftone tables of a plurality of types, and one of the tables is selected when printing.

The multiple-value signal (in the present embodiment, a four-value marking signal) generated by the halftone processing unit 66 is sent to the marking unit 68 and is used to control driving of ejection energy generating elements (for example, piezoelectric elements or heating elements) of the corresponding nozzles. More specifically, the ink ejection from the respective nozzles in the marking unit 68 is controlled in accordance with this four-value signal. A large dot is recorded on the recording medium with the large ink droplet, a medium dot is recorded on the recording medium with the medium ink droplet, and a small dot is recorded on the recording medium with the small ink droplet. Thus, multiple tones are reproduced by surface area tones based on the arrangement of the ink dots formed on the recording medium.

The marking unit 68 is constituted of the inkjet heads, which serve as the liquid ejection heads. In the present embodiment, the case is described in which the inks of four colors, cyan (C), magenta (M), yellow (Y) and black (K) are used, and the inkjet heads are arranged for the respective colors, as devices for ejecting the inks of the respective colors. However, the combination of ink colors and the number of colors are not limited to the present embodiment.

The inkjet printing system 10 according to the present embodiment is configured to record an image by a single-pass method. More specifically, the inkjet printing system 10 is able to record an image of a prescribed recording resolution (for example, 1200 dpi) on an image forming region of the recording medium, simply by performing one operation (one sub-scanning operation) of relatively moving the recording medium with respect to the inkjet heads of the respective colors. A plurality of ink ejection nozzles are arranged through a length corresponding to the maximum width of the image forming region of the recording medium, on an ink ejection surface (nozzle surface) of each of the inkjet heads. A high recording resolution can be achieved by a composition in which the nozzles are arranged in a two-dimensional configuration on the ink ejection surface.

In the case of the inkjet head having the two-dimensional nozzle arrangement, a projected nozzle row in which the nozzles in the two-dimensional nozzle arrangement are projected (by orthogonal projection) to an alignment in a direction (corresponding to a "main scanning direction") which is perpendicular to the medium conveyance direction (corresponding to a "sub-scanning direction") can be regarded as equivalent to a single nozzle row in which the nozzles are arranged at substantially even intervals at a nozzle density which achieves the recording resolution in the main scanning direction (the medium width direction). Here, the term of "substantially even intervals" means substantially even intervals between the droplet deposition points which can be recorded by the inkjet printing system. For example, the concept of "even intervals" also includes cases where there is slight variation in the intervals, to take account of manufacturing errors or movement of the droplets on the medium due to landing interference. Taking account of the projected nozzle row (also referred to as the "effective nozzle row"), it is possible to associate the nozzle positions (nozzle numbers) in the alignment sequence of the projected nozzles which are aligned following the main scanning direction. In the description given below, reference to "nozzle positions" means the positions of the nozzles in the effective nozzle row.

<Description of Image Data Processing Unit 30 in Computer 12>

The image data processing unit 30 is configured to previously calculate an amount of ink to be used in printing image data, before printing the image data, and to evaluate whether or not the calculated amount of ink exceeds a threshold value (a specific value that indicates an upper limit of the tolerable range) for the ink amount at which cockling of a level that is problematic for the conveyance of the paper is predicted to occur. If the calculated amount of ink exceeds the prescribed threshold value as a result of evaluating (predicting) the amount of ink by the image data processing unit 30, the judgment result is displayed on the monitor 14 through the UI control unit 52. In conjunction with this display of the evaluation result, an instruction inputted through the input device 16 is accepted, an operation for changing (amending) the tone conversion LUT, the non-uniformity correction LUT, the halftone table, and the like, is prompted, and the density is adjusted in such a manner that the output density (ink amount) comes within the specified value. As an alternative response, the execution of the print job is cancelled.

The image data stored in the image data DB 24 as a printing object is converted to reduced image data in the image reduction processing unit 32, in order to calculate the ink use amount for the image formation. There are no particular restrictions on the conditions relating to the format of the image data (the original image data that was inputted) stored in the image data DB 24, and the number of pixels, and resolution, and the like.

For example, the input original image data can be in the form of page-description language data of the original image data size corresponding to "B2" in the JIS (Japanese Industrial Standard) paper dimensions of 728 millimeters (mm) by 515 mm. The input image data can be data of 8 bits for each of the colors R, G and B (24-bit color data), or can be data of 8 bits for each of the colors which are converted into the ink colors (for example, four colors of C, M, Y and K). In order to align the format of the images stored in the image data DB 24, it is possible to carry out pre-processing, such as pixel number conversion processing, color conversion processing, or the like, in the computer 12. In this case, the computer 12 is provided with a pixel number conversion processing unit, a color conversion processing unit, and the like.

The input image data stored in the image data DB 24 has a relatively large data volume, and if the input image data is processed directly in calculating the evaluation of the ink use amount for the image formation, then the calculation load is too large. Hence, from the viewpoint of achieving efficient calculation, the image data is reduced to a data size that can be easily calculated in the present embodiment. More specifically, the reduced image of a prescribed resolution (which may be referred to as a "thumbnail") is generated from the input image data by the image reduction processing unit 32. There are no particular restrictions on the resolution of the reduced image, and the input image is converted to a suitable resolution (number of pixels) depending on the size of the filter used for filter processing in the image analysis unit 38 described below. For example, the input image is converted to an image of a resolution in which one side of a pixel in the reduced image corresponds to a size of approximately 1 mm on the printing paper (namely, a resolution of about several tens dpi; for example, approximately 25 dpi).

The size of the filter (spatial filter) used when judging an extent of paper deformation (undulation) due to cockling is such that the filter applies calculation to a range of pixels in a region having sides of around 1 centimeter (cm), for example.

In a case of this kind, desirably, the surface area per pixel in the reduced image data is approximately one tenth of the size of the filter.

The reduced image data generated by the image reduction processing unit 32 is sent to the image conversion unit 34, and the image conversion processing corresponding to the tone adjustment processing and the non-uniformity correction processing is carried out in the image conversion unit 34. The image conversion processing carried out in the image conversion unit 34 is alternative processing corresponding to a combination of the tone conversion processing and the non-uniformity correction processing carried out by the image processing board 60 in the printer 18. The tone conversion LUT used in the image conversion unit 34 is equivalent to the tone conversion LUT used in the tone conversion processing unit 62 in the image processing board 60 of the printer 18, and is supplied from the tone conversion LUT DB 40. After the conversion using the tone conversion LUT in the image conversion unit 34, the non-uniformity correction processing is carried out using the non-uniformity correction thumbnail LUT.

The non-uniformity correction LUTs, which are used in the non-uniformity correction processing unit 64 of the image processing board 60, are allocated respectively to the nozzles, and since these LUTs have a large data volume, a non-uniformity correction thumbnail LUT is created by editing and compiling the data to obtain that data required for calculation in relation to the reduced image data, and the created non-uniformity correction thumbnail LUT is used in the image conversion unit 34.

Here, the stepwise processing method is described in which the tone conversion processing is carried out using the tone conversion LUT in the image conversion unit 34, and then the non-uniformity correction processing is carried out using the non-uniformity correction thumbnail LUT; however, the processing is not limited to the two-step processing of this kind. It is also possible obtain the result of the conversion which integrates the tone conversion and the non-uniformity correction by one conversion calculation, by using one LUT which integrates the tone conversion LUT and the non-uniformity correction thumbnail LUT in the calculation performed in the image conversion unit 34. This integrated conversion processing also corresponds to the image conversion processing using the tone conversion LUT and the non-uniformity correction thumbnail LUT.

The reduced image data converted by the image conversion unit 34 is converted into ink amount distribution data by the ink amount data calculation unit 36. The ink amount data calculation unit 36 calculates an ink amount per pixel from the dot size-specific ratio when the signal values of the respective pixels of the reduced image data are represented by a halftone dot arrangement, and the information about the ink droplet volumes corresponding to the dot sizes.

The halftone DB 44 stores the information about the dot size-specific ratios corresponding to the signal values of the pixels, and the information about the ink droplet volume for each dot size (droplet size). The ink amount data calculation unit 36 acquires the information from the halftone DB 44, determines ink amounts for the ranges corresponding to the respective pixels of the reduced image data, and assigns these ink amounts to the pixel coordinates, thereby obtaining distribution data. Furthermore, the ink amount data calculation unit 36 generates the ink amount distribution data for the whole of the reduced image (one plane), by summing up, for all of the colors, the ink amount distribution data determined for the respective ink colors of CMYK.

The ink amount distribution data of the reduced image generated by the ink amount data calculation unit 36 is sent to the image analysis unit 38, and filtered by the image analysis unit 38, and it is then judged whether or not there is any location on the image for printing where the ink amount exceeds the specific value. If the ink amount distribution has the ink amount exceeding the specific value, a notification is displayed on the monitor 14 in order to tell the operator that the ink amount will exceed the specific value when the object image data is printed and that a problem will occur during the printing.

On the other hand, if the result of the judgment made by the image analysis unit 38 shows that the ink amount distribution does not have the ink amount exceeding the specific value, no marked problems will occur when the image data is printed, and therefore no special display is shown on the monitor, for instance, and the processing is terminated. It is also possible that if the ink amount distribution does not have the ink amount exceeding the specific value, information which explicitly informs the operator that the printing will be successfully performed is displayed on the monitor 14.

Figure 2:
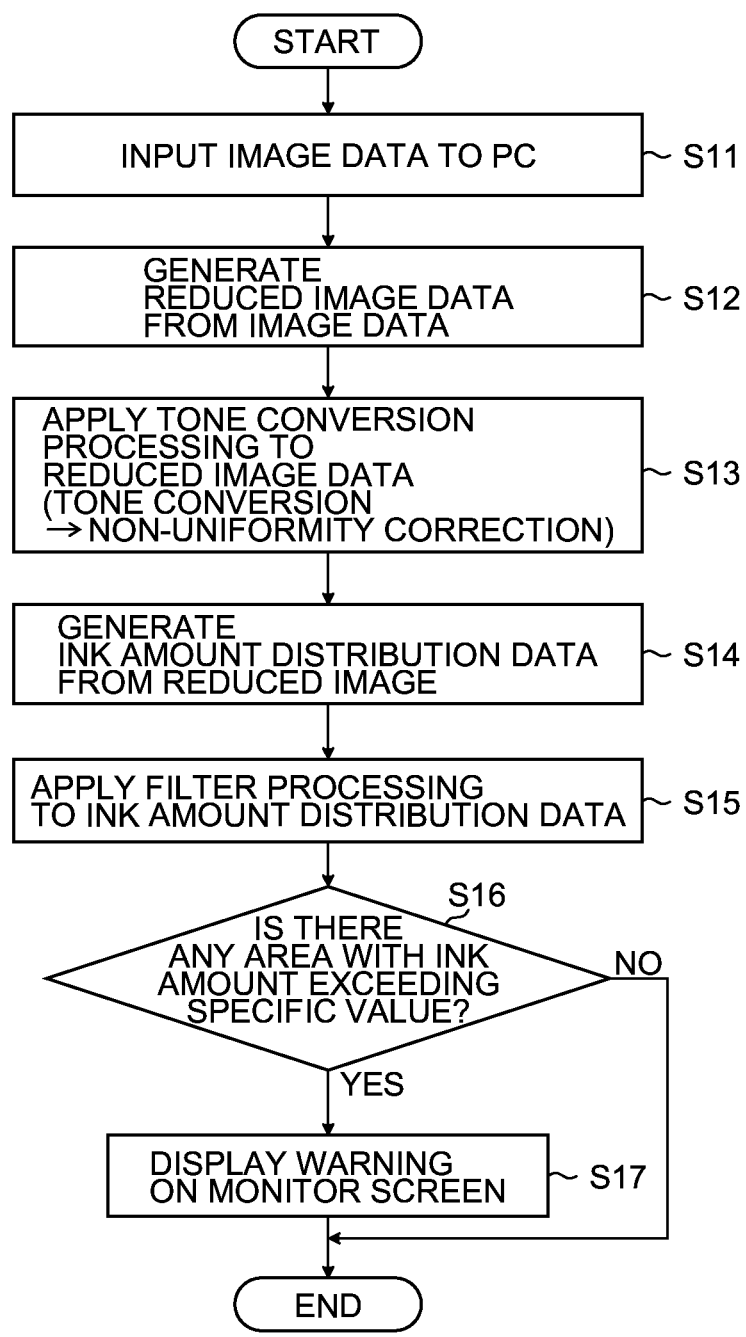
FIG. 2 is a flowchart showing a flow of signal processing for evaluating an ink use amount.

FIG. 2 is a flowchart showing a flow of the signal processing in the computer 12. Firstly, the image data is inputted to the computer 12 (step S11). The reduced image data is generated from the input image data either after the input image data has been stored in the image data DB, or in parallel with processing for storing the data in the image data DB (step S12). The reduced image data is generated in the image reduction processing unit 32 shown in FIG. 1.

The resolution per pixel of the reduced image data defines a resolution corresponding to a size that is determined by the size required for filtering in the image analysis unit 38, and the reduction processing is carried out to achieve this resolution. There are various methods, such as a thinning process, which can be used as the reduction processing method for generating the reduced image data, and a desirable method for raising the accuracy of evaluation and judgment of the used ink amount is a method which averages a range of the input image data corresponding to the surface area per pixel of the reduced image, and assigns this data as one pixel of the reduced image.

Figure 3:
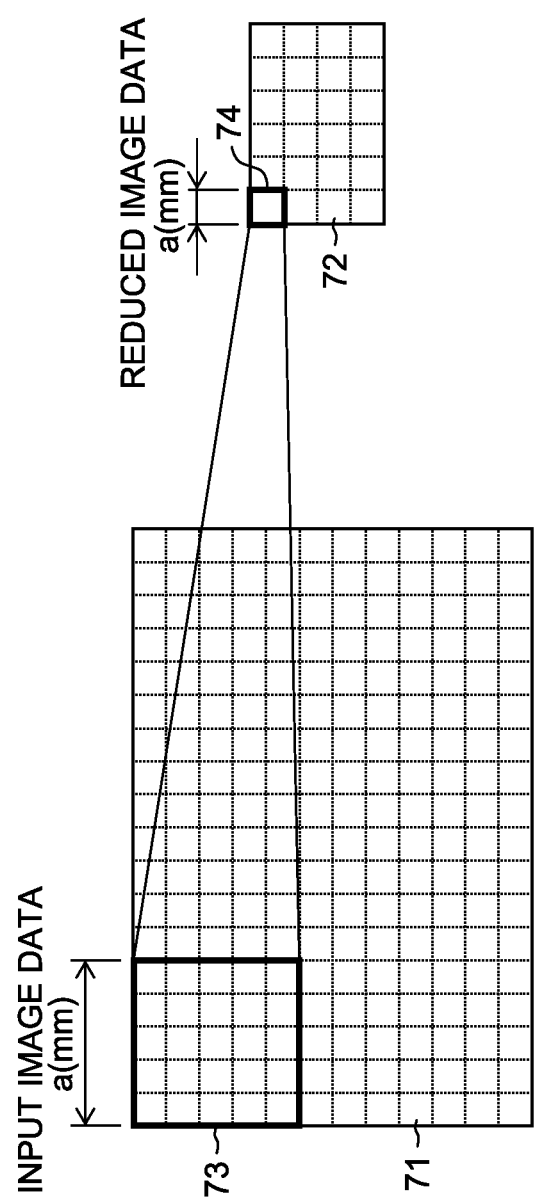
FIG. 3 is an illustrative diagram showing an example of image reduction processing.

FIG. 3 is an illustrative diagram showing one example of the image reduction processing. The left-hand side in FIG. 3 shows the original input image data before the image reduction processing, and the right-hand side in FIG. 3 shows the reduced image data after the image reduction processing. In FIG. 3, for the purpose of clarity, a reduced number of pixels are depicted. In the input image data shown on the left-hand side of FIG. 3, one cell 71 in the lattice defined with the dotted lines represents one pixel of the input image data. In the reduced image data shown on the right-hand side of FIG. 3, one cell 72 in the lattice defined with the dotted lines represents one pixel of the reduced image data.

In FIG. 3, a prescribed pixel range (a range 73 defined with the thick lines of 5×5=25 pixels is shown by way of example) in the input image data corresponds to one pixel of the reduced image data (a range 74 defined with the thick lines). One pixel of the reduced image data shown in FIG. 3 corresponds to a square range having sides of a mm (the square range of a mm×a mm) on the printing paper (where a is a constant expressed by any positive number), and the signal values of the input image data are averaged in a range of pixels of the original input image data which belong to the range of this one pixel of the reduced image data, the resulting average value being taken as the value for one pixel (pixel value) of the reduced image. In other words, the average value of the 25 pixels in the range 73 defined with the thick lines in FIG. 3 is assigned as the signal value of the one pixel 74 defined with the thick lines in the reduced image data. A similar averaging process is applied to all of the input image data, thereby generating the reduced image data. In so doing, since the average value of the prescribed range in the original input image is introduced to one pixel of the reduced image, then the ink amount information is conserved. Therefore, highly accurate calculation results are obtained in the calculation for evaluating the ink amount. In FIG. 3, the reduction rate of $\frac{1}{25}$ is given by way of example, for the sake of convenience; however, the actual reduction rate can be smaller than this, and the data volume can be reduced significantly from 1200 dpi of the original image to about 25 dpi, for instance.

As another method for achieving accuracy, a desirable method is one in which the pixel values in a range corresponding to the surface area per pixel of the reduced image in the input image are summed and are assigned to one pixel by means of a table which converts this data sum value into a signal value of the reduced image. In this case, the table is prepared in advance which specifies a correspondence relationship for assigning a signal value j of the reduced image to a data sum value s, and this table is used to convert the data sum value s into the signal value j of the reduced image which is assigned to the pixel. Even if a method of this kind is used, since the information about the signal values of the input image data before the reduction processing is conserved in average, then it is possible to calculate the amount of ink with high accuracy.

There is also a further method in which a representative value is specified from the signal values in the prescribed pixel range of the original input image data, and this representative value is assigned as the signal value of one pixel in the reduced image data. The method of specifying the representative value can use the arithmetic mean, the geometric mean, the median, the most common value, or the like. Furthermore, it is also possible to specify the suitable representative value from a histogram, or to specify the representative value from a range excluding a maximum value and a minimum value, etc., or alternatively, to suitably combine modifications in the statistical calculation, such as specifying the representative value as the average of a certain upper percentage of the signal value distribution.

The reduced image data generated by the image reduction processing unit 32 desirably has a signal depth (the range of numerical values to be quantized) of not smaller than 16 bits, in order to maintain the necessary resolution of the ink amount when converting to ink amount distribution data in the subsequent processing step by the ink amount data calculation unit 36.

The signal depth (the number of tones) of the input image data before the reduction processing is 8 bits (i.e., 256 tones) per color, for example. The image reduction processing unit 32 carries out processing for reducing the number of pixels in the image data and also converts the signal depth for each pixel to 16 bits. The reduced image data thus generated by the image reduction processing unit 32 is sent to the image conversion unit 34 and is then subjected to the tone conversion processing.

In the image conversion unit 34, in the first part, the tone conversion processing is carried out to convert the whole surface of the image data by using the same LUT (tone conversion LUT), and in the second part, the non-uniformity correction processing is carried out (step S13 in FIG. 2).

The conversion processing using the tone conversion LUT specifies the density characteristics for the whole image. The tone conversion processing can employ a method using a one-dimensional LUT (1D-LUT) specifying the conversion relationship for each signal, or a method using an n-dimensional (multi-dimensional) LUT (nD-LUT) specifying the conversion relationship corresponding to a combination of plurality of color signals.

The non-uniformity correction processing in the image conversion unit 34 corresponds to processing for correcting fluctuation in the output density between the nozzles. This processing is carried out by selecting, from the non-uniformity correction thumbnail LUTs, the LUT for the position corresponding to the coordinates corresponding to the nozzle arrangement, of the coordinates in the reduced image. The correspondence relationship between the positions of the pixels in the reduced image data, and the range of the nozzles corresponding to the surface area of the pixels is ascertained in advance, and the range of the nozzles which perform the image formation in the region corresponding to the surface area of a particular pixel of the reduced image data is saved in the computer 12 as known information.

The non-uniformity correction thumbnail LUT is created by compiling, in one LUT, the LUTs corresponding to the width per pixel of the reduced image, from the non-uniformity correction LUTs assigned to the respective nozzles which are stored in the non-uniformity correction LUT DB 42.

One method for generating the non-uniformity correction thumbnail LUT in the non-uniformity correction thumbnail LUT generation unit 56 is to create an LUT corresponding to one pixel of the reduced image by averaging the LUTs corresponding to the width per pixel of the reduced image, from the non-uniformity correction LUTs which are specified respectively for the nozzles. This method is one example, and the method of creating the non-uniformity correction thumbnail LUT which associates one LUT with each uniform width in the nozzle alignment direction, in accordance with the resolution of the reduced image, from the non-uniformity correction LUTs, is not limited to the example described above.

As another method for creating the non-uniformity correction thumbnail LUT, it is also possible to use a method which takes the non-uniformity correction LUTs and sets the LUT having the largest value in the range of LUTs corresponding to the width per pixel of the reduced image, as the LUT corresponding to one pixel of the reduced image. The method of creating the non-uniformity correction thumbnail LUT is set to a suitable mode depending on the filter used in the image analysis unit 38 at the subsequent stage, and the threshold value (specific value) used for judging the ink amount, and so on.

There is no particular restriction on the timing for generating the non-uniformity correction thumbnail LUT, but desirably, for example, non-uniformity adjustment is carried out on a print, a non-uniformity correction thumbnail LUT is generated immediately after generating a new non-uniformity correction LUT, and data of the newest non-uniformity correction thumbnail LUT is set in an area that can be processed by the image conversion unit 34.

The operator monitors the state of printing, and when the operator enters an "image adjustment" instruction through the input device 16, according to requirements, the system enters into an adjustment processing operation, a test pattern for the non-uniformity correction is printed and the printing results thereof are read in, the non-uniformity correction LUT is created on the basis of the read information, and the information in the non-uniformity correction LUT DB 42 is updated. Immediately after this, desirably, the non-uniformity correction thumbnail LUT is also created from the newest non-uniformity correction LUT, and the newest non-uniformity correction thumbnail LUT is set in a prescribed memory area (a storage location where this table is referred to). By thus updating also the non-uniformity correction thumbnail LUT to the newest data at all times, together with the updating of the non-uniformity correction LUT, it is possible to shorten the calculation processing time.

Furthermore, the composition is not limited to one which generates the non-uniformity correction thumbnail LUT simultaneously with the generation of the non-uniformity correction LUT (immediately after generation of the non-uniformity correction LUT), and it is also possible to create the non-uniformity correction thumbnail LUT from the non-uniformity correction LUT, as necessary, in accordance with the requirements of the ink use amount evaluation calculation.

Figure 4:
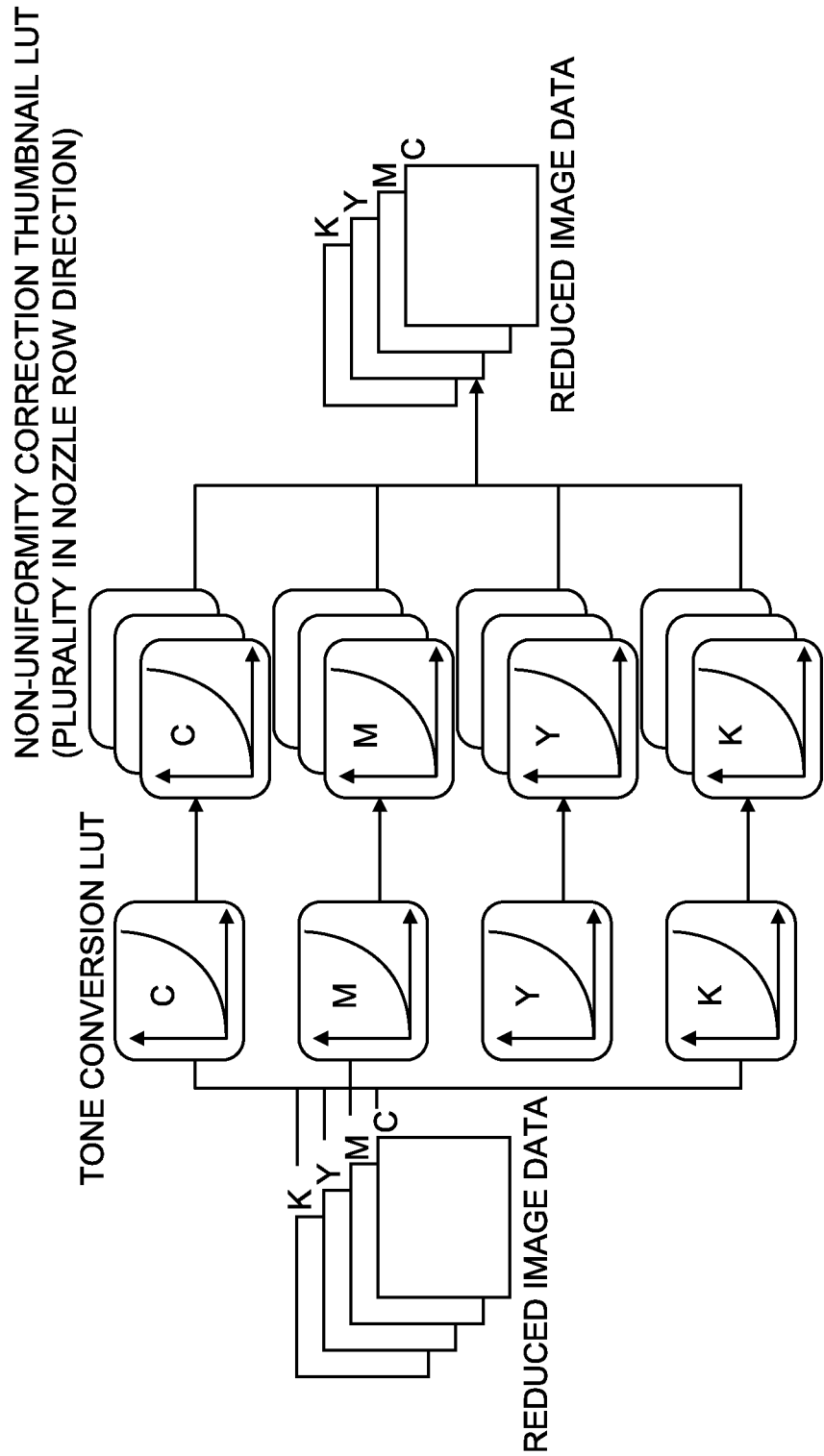
FIG. 4 is a schematic drawing showing the contents of image conversion processing in an image conversion unit.

FIG. 4 is a conceptual diagram showing details of the image conversion processing in the image conversion unit 34. After the reduced image data for each of the colors of CMYK has been subjected to the tone adjustment using the tone conversion LUT for each color, the non-uniformity correction processing is carried out using the non-uniformity correction thumbnail LUT for each color. FIG. 4 shows a color-specific one-dimensional LUT as an example of the tone conversion LUT.

Figure 5:
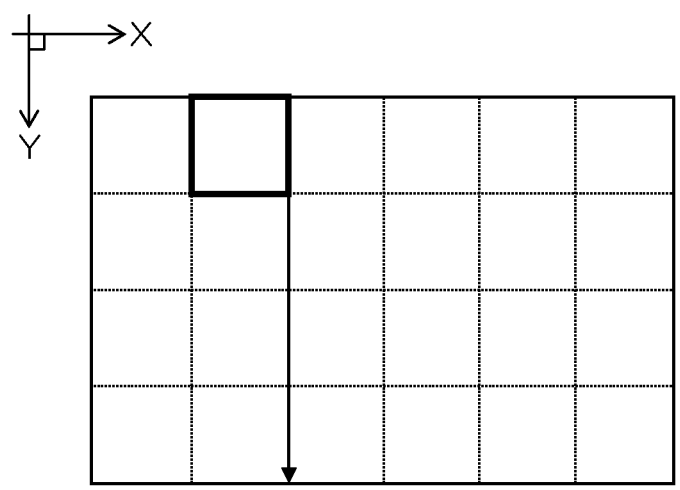
FIG. 5 is an illustrative diagram showing a method of applying a non-uniformity correction thumbnail LUT.

The non-uniformity correction thumbnail LUTs of each color include a plurality of tables in the nozzle row direction. The nozzle row direction is a direction in which the nozzles of the inkjet head are effectively aligned so as to achieve a prescribed recording resolution. As shown in FIG. 5, when coordinate axes (x axis and y axis) are introduced in the lateral direction (x direction) and the longitudinal direction (y direction) of the reduced image data, and the positions of the respective pixels are expressed by coordinates (x, y) on the xy plane, for instance, then the nozzles of the inkjet head are aligned in the x direction. In this case, the tables which associate one LUT with one pixel are held in accordance with the pixel positions in the x direction of the reduced image data.

More specifically, the non-uniformity correction thumbnail LUT is used as a function of the pixel position (x), and the same LUT setting is used for each unit in the nozzle row direction (shown here as the x direction). Provided that pixels of the reduced image data have the same x coordinate, then the same LUT is used for these pixels, even though they have different y coordinates. FIG. 5 shows the case where the same non-uniformity correction thumbnail LUT is used in a pixel row of the same x coordinate (pixels aligned in the y direction) as the pixel surrounded by the thick lines. In this way, the conversion processing using the tone conversion LUTs and the non-uniformity correction thumbnail LUTs is carried out, thereby obtaining the converted reduced image data.

The converted reduced image data which has been subjected to the tone conversion processing by the image conversion unit 34 (see FIG. 1) is sent to the ink amount data calculation unit 36, and the ink amount distribution data is generated from the reduced image data (step S14 in FIG. 2). In the ink amount data calculation unit 36, an ink amount distribution is generated using the halftone data and the ink droplet volume data. One method for this processing is to determine the ink dot size-specific ratio when the image has been subjected to the halftone processing corresponding to the reduced image data, multiplying this ratio by the ink droplet volumes of the respective ink dot sizes and summing the ink droplet volumes of the respective dot sizes to determine the ink amount corresponding to each color.

In this case, rather than actually performing the halftone processing of the reduced image data, a table which associates the ink dot size-specific ratio data when reproducing tones in the printer 18, with the signal values in the reduced image data, is prepared, and the ink dot size-specific ratio in the prescribed surface area is ascertained from this table of the halftone data. For example, an average dot size-specific recording ratio per unit surface area is identified for a particular signal value j as the ratio of data having four values of 40% no dots (white or blank), 30% small dots, 25% medium dots and 5% large dots, for instance.

Ink amount distribution data for each of the CMYK signals is obtained by multiplying the ink droplet value per dot for each dot size by the ink dot size-specific ratio. Moreover, the ink amount per pixel in the reduced image is determined by summing, for each pixel, the ink amount distribution data for the respective colors. The ink amount distribution data is generated by assigning coordinates to the ink amount data.

Figure 6:
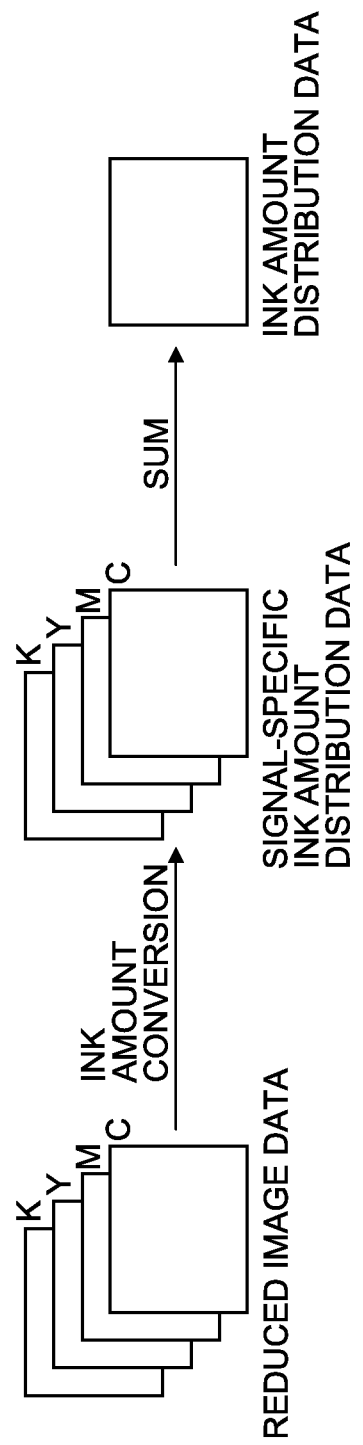
FIG. 6 is an illustrative diagram showing a schematic view of a process for obtaining ink amount distribution data from reduced image data.

FIG. 6 shows a schematic illustration of a procedure for generating the signal-specific ink amount distribution data from the signal-specific reduced image data for the colors of CMYK, and summing this data together to generate the ink amount distribution data. Desirably, the ink amount distribution data uses a signal depth of not smaller than 16 bits in order to maintain the ink amount resolution which is necessary in the image analysis unit 38.

The image analysis unit 38 (see FIG. 1) judges whether or not the ink amount exceeding the specific value is to be used, on the basis of the ink amount distribution data generated as described above. A filtering processing is applied to the ink amount distribution data in the image analysis unit 38 (step S15 in FIG. 2) and it is judged whether or not the ink use amount in each area of a certain surface area exceeds the specific value (step S16 in FIG. 2).

Figure 7:
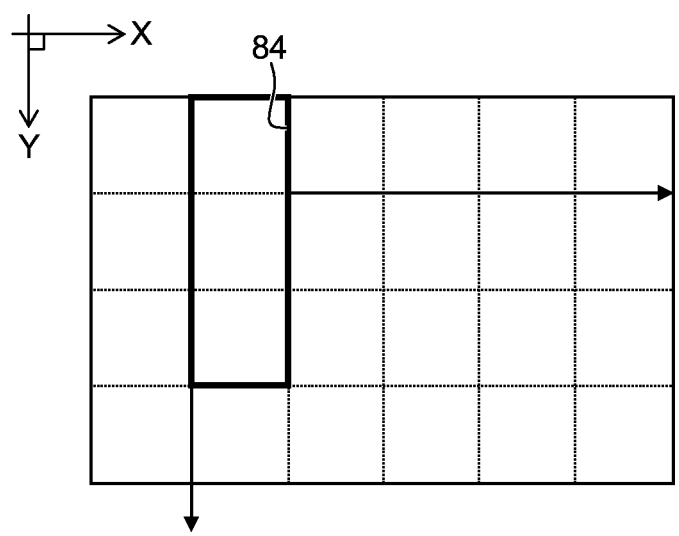
FIG. 7 is an illustrative diagram of a filtering process applied to ink amount distribution data.

FIG. 7 is an illustrative diagram of the filtering process applied to the ink amount distribution data. In FIG. 7, a filter 84 is applied to the plurality of pixel regions in the ink amount distribution data. Here, for the convenience of the drawing, the filter 84 that spans a pixel row range of three pixels aligned in the y direction is shown by way of example, but various modes can be adopted for the type and size of the filter. Here, the one-dimensional filter in the y direction is shown by way of example, but it is also possible to use a one-dimensional filter in the x direction, or to use a two-dimensional filter.

The prescribed filter 84 is applied repeatedly to the ink amount distribution data while changing the pixel position subject to calculation, in the x direction and the y direction. An arrow along the x direction and an arrow along the y direction in FIG. 7 indicate the aspect of progress of sequential filtering by the filter 84 while changing the position respectively in the x direction and the y direction. The size of the filter 84 is designed to a suitable size in accordance with the size of the image region in which the ink use amount is evaluated.

As a result of this judgment, if there is an area where the ink use amount exceeds the specific value, then a warning is displayed on the screen of the monitor 14 (step S17). On the other hand, if there is no area where the ink use amount exceeds the specific value in the judgment in step S16, then the warning display in step S17 is omitted and processing is terminated.

Ink amount judgment for preventing paper conveyance errors caused by cockling is described by way of example. If the amount of ink per unit surface area of the paper increases, then paper deformation (cockling) can occur due to the paper absorbing water, and as a result of this, paper conveyance errors may arise (for example, problems such as the paper making contact with the nozzle surface of the inkjet head, or the like, may occur). With the principal objective of preventing the paper conveyance errors, in the image analysis unit 38, a judgment is carried out to determine whether or not there is a location where an amount of ink exceeding the prescribed amount (specific value) is used within a prescribed area of the paper, and if a judgment result is obtained indicating that there is the location having the amount of ink exceeding the specific amount, processing is carried out to switch on a warning judgment calculation identifier (for example, a flag which controls whether or not a warning display is necessary), in order to issue a warning that there is a possibility of a paper conveyance error.

In the case of this example, the filter 84 of the size corresponding to the prescribed area is assigned to various locations within the ink amount distribution data, processing is carried out to check whether or not the value of the ink amount exceeds the specific amount, and the on/off switching of the warning judgment calculation identifier is decided. The threshold value of the ink amount which is used to judge whether or not the ink amount exceeding the specific value is used is set to different values depending on the paper type, the paper size, the paper thickness, the paper texture, and which of the front and rear surfaces of the paper receives the ink. Furthermore, the threshold value is not limited to one value, and there is also a method in which the threshold value is specified from a plurality of evaluation indicators.

The relationship between cockling and paper conveyance errors is ascertained as empirical data indicating the ink amount on a certain surface area of the paper at which there is a risk of paper conveyance errors (paper conveyance cannot be guaranteed). On the basis of these conditions, the judgment conditions and the threshold value are specified for each type of paper and each model of inkjet printer.

It is possible to adopt a composition in which one threshold value is set for one type of filter 84 as shown in FIG. 7, or a mode where a plurality of filters of different sizes (surface areas) are used, threshold values are specified independently and respectively for the filters, and an overall unsatisfactory verdict is returned if the threshold value is exceeded in any one of the filters.

As a result of the analytical processing by the image analysis unit 38, if the warning judgment calculation identifier is set to on, then a warning is displayed on the screen of the monitor 14 (step S17 in FIG. 2).

FIGS. 8 and 9 show examples of the display screen. Immediately after the input image data has been stored in the image data DB 24 of the computer 12, the ink use amount evaluation calculation is started by the image data processing unit 30, and the judgment result is displayed on a job list on the monitor 14. In the example shown in FIG. 8, a highlight is displayed against a job for which the ink use amount is judged to be exceeding the specific value, and a warning text "NG" is placed alongside the job. The specific mode of the warning display is not limited to the illustrated example, and as shown in the example given here, a differentiating display is implemented in such a manner that the job in which a paper conveyance error is expected is clearly distinguished from other jobs for which normal printing is possible (OK jobs), for instance, by changing the background color or the text color, adding a display using an identifying text or symbol, or the like.

Alternatively, as shown in FIG. 9, it is possible to clearly distinguish the display regions on the screen of the monitor 14 between a group of jobs which can be printed normally without problems (a group of jobs which do not give rise to a warning), and a group of jobs for which a paper conveyance error is expected (a group of jobs which give rise to a warning). In FIG. 9, the satisfactory jobs are displayed separately in the upper part of the screen, and the unsatisfactory jobs are displayed separately in the lower part of the screen. In the examples in FIGS. 8 and 9, the screens which show the text lists of jobs corresponding to the respective images are displayed, but it is also possible to display the image contents of the print objects either instead of or combination with the respective job IDs. On the basis of the monitor display illustrated in FIG. 8 or 9, the operator is able to respond by cancelling the print jobs of the image data relating to the warnings, or by correcting the print conditions.

When the tone conversion LUT and/or the non-uniformity correction LUT are updated, the ink amount distribution results change, and therefore the judgment results are updated each time the LUTs are updated. In other words, in the system according to the present specification, when the tone conversion LUT or the non-uniformity correction LUT is updated, the ink amount distribution data is recalculated on the basis of the updated table, and a rejudgment is made with regard to whether or not the ink use amount exceeds the specific value. The display of the monitor 14 is updated in accordance with the rejudgment result.

Thus, the ink amount distribution data which reflects the newest image adjustment parameters is calculated at all times, and it is judged whether or not print quality is affected on this basis. Consequently, it is possible to achieve highly accurate judgment.

In the description given above, the example is given in which the presence or absence of effects on the print quality is judged from the viewpoint of guaranteeing paper conveyance; however, it is also possible to judge the presence or absence of effects on the print quality from the viewpoint of decline in image quality due to deviation in the depositing positions, and the like. It is possible to evaluate the effects on print quality from various viewpoints, in accordance with the mode of the filter used in the image analysis unit 38 and the judgment threshold value settings.

<Description of Image Processing in Image Processing Board 60>

A concrete example of signal processing by the image processing board 60 in the printer 18 is described with reference to FIGS. 10 to 13.

Figure 10:
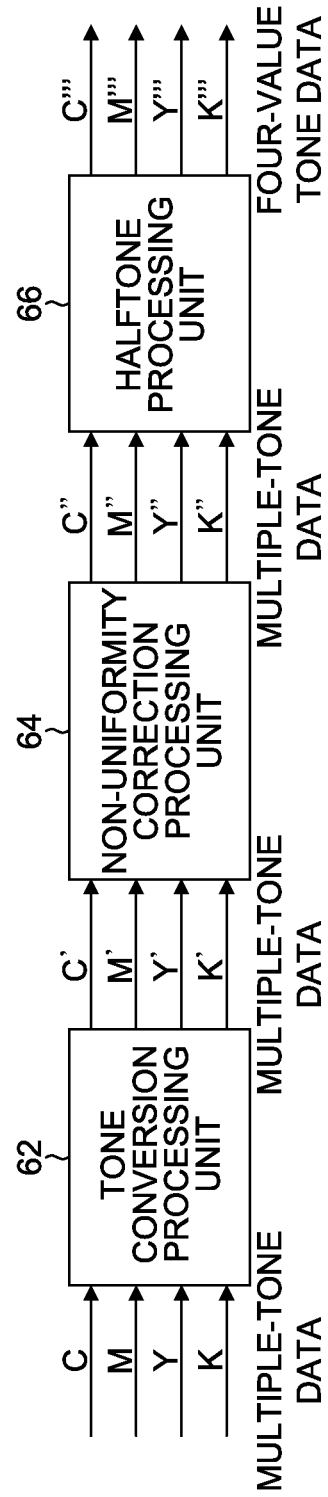
FIG. 10 is an illustrative diagram of a processing procedure in an image processing board in a printer.

FIG. 10 is an illustrative diagram showing the processing sequence of the image processing board 60. Multiple-tone data divided into the respective colors of C, M, Y and K is inputted to the tone conversion processing unit 62. Here, it is supposed that the multiple-tone image data for each ink color in the marking unit 68 is supplied (for example, 256-tone image data for each of the four colors of CMYK).

Commonly known color conversion processing and resolution conversion processing are carried out if 24-bit RGB full-color image data (8 bits per color) is inputted, or if there is a difference between the resolution of the input image and the output resolution of the inkjet image forming apparatus.

The tone conversion processing unit 62 employs the tone conversion LUTs for the respective colors of C, M, Y and K, and converts the input signal to a certain target density tone. The CMYK signal inputted to the tone conversion processing unit 62 is converted to a C'M'Y'K' signal by the tone conversion LUTs for the respective colors.

Figure 11:
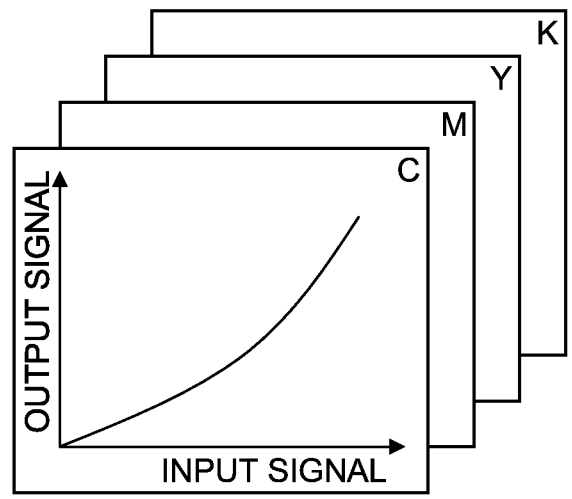
FIG. 11 is an illustrative diagram of a tone conversion LUT used in a tone conversion processing unit.

FIG. 11 is a conceptual diagram of the tone conversion LUTs used in the tone conversion processing unit 62. As shown in FIG. 11, the tone conversion LUTs are prepared respectively for the signals of the colors C, M, Y and K, and each tone conversion LUT specifies an input/output relationship for converting the input signal value to the output signal value. The signals which have been converted in accordance with the tone conversion LUTs are inputted to the non-uniformity correction processing unit 64 (see FIG. 10).

Figure 12:
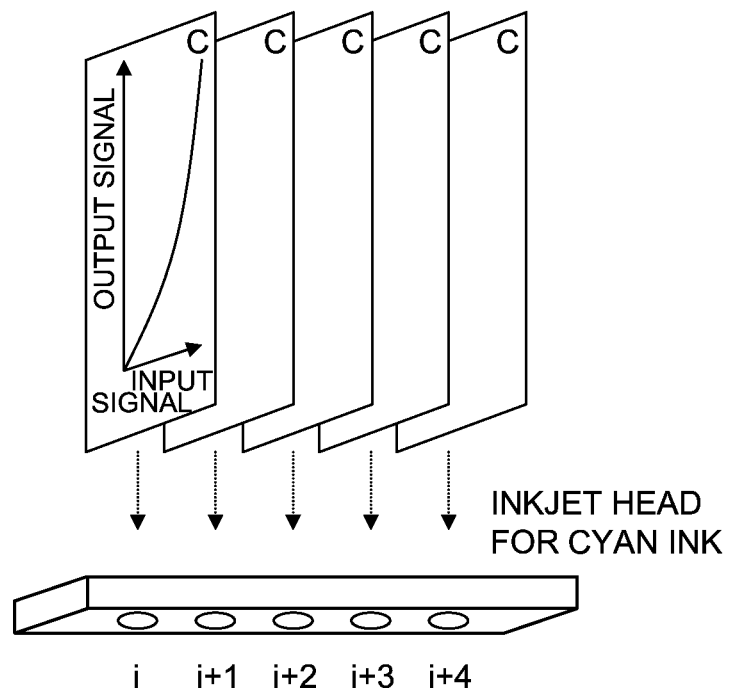
FIG. 12 is an illustrative diagram of correction processing in a non-uniformity correction processing unit.

FIG. 12 is a conceptual diagram of the correction processing in the non-uniformity correction processing unit 64 (see FIGS. 1 and 10). In FIG. 12, a reduced number of the nozzles are depicted in the C ink inkjet head; however, actually there are respective ejection correction LUTs corresponding to all of the nozzles arranged in each color head. The values i, i+1, . . . , i+4 in FIG. 12 represent the nozzle numbers. A nozzle number i can be assigned to each nozzle as a consecutive integer, i=1, 2, 3, . . . , from the end of the effective nozzle row which is capable of forming a dot row at the recording resolution, and the position of each nozzle can be identified by the nozzle number. The nozzle number represents the nozzle alignment sequence in the effective nozzle row in the nozzle arrangement where the plurality of nozzles are arranged so as to be able to record droplet deposition points (recording positions) on the recording medium at the recording resolution.

As shown in FIG. 12, for each nozzle, there is the LUT which specifies the conversion relationship between the input signal value and the output signal value for that nozzle. A LUT group is formed by collecting these tables for all of the nozzles. A similar LUT groups exist for the respective color heads.

The non-uniformity correction processing unit 64 (shown in FIGS. 1 and 10) converts the input C'M'Y'K' data to C"M"Y"K" data, using the non-uniformity correction LUTs. In FIGS. 1 and 10, for the sake of the description, the example is shown in which the tone conversion processing and the nozzle ejection correction processing are carried out stepwise; however, it is also possible to adopt a calculation method in which the tone conversion LUT and the non-uniformity correction LUT are combined into one LUT, and these conversion processes are carried out simultaneously. The converted signal generated by the tone conversion processing and the nozzle ejection correction processing is inputted to the halftone processing unit 66.

Figure 13:
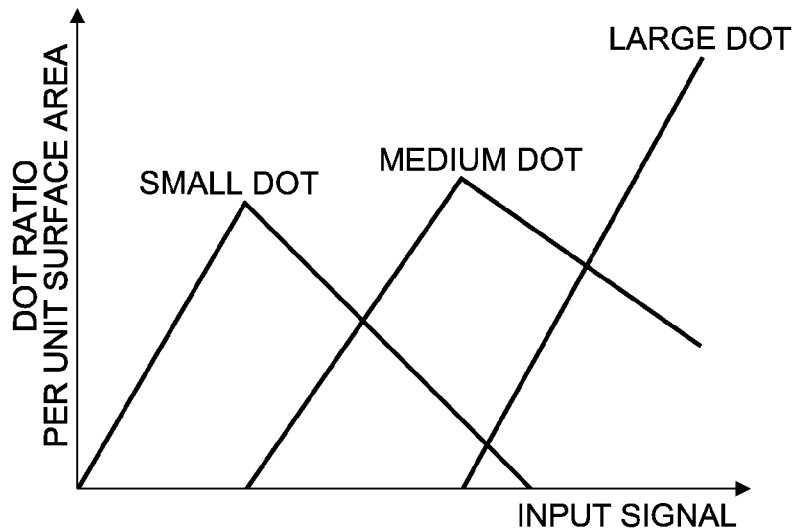
FIG. 13 is a diagram showing an example of a halftone table employed in a halftone processing unit.

FIG. 13 shows one example of the halftone table which is employed in the halftone processing unit 66 (see FIGS. 1 and 10). The horizontal axis in FIG. 13 represents an input signal and the vertical axis represents an amount indicating the recording ratio (dot ratio) of large, medium and small ink dots per unit surface area. For example, the vertical axis in FIG. 13 is an amount which indicates a ratio of the respective numbers of large, medium and small-dot inks which are ejected in a region where ink droplets can be ejected in a maximum of 100 pixels (corresponding to the "unit surface area"). A plurality of halftone tables specifying the ratio in which the respective types of dots are to be used are prepared for the input signal values, and one of these tables is selected when printing.

<Description of Method of Generating Nozzle Ejection Correction LUT>

Figure 14:
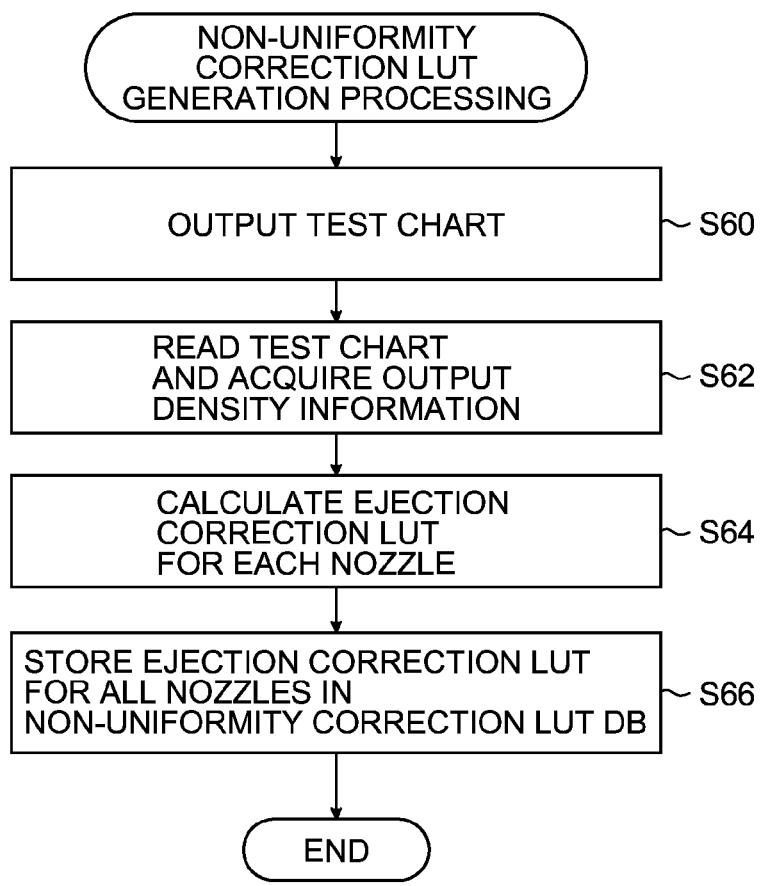
FIG. 14 is a flowchart showing an example of a procedure for generating a non-uniformity correction LUT.

The non-uniformity correction LUTs applied in the nozzle ejection correction processing unit 64 (shown in FIGS. 1 and 10) can be generated by a procedure such as the following. FIG. 14 is a flowchart showing one example of the procedure for generating the non-uniformity correction LUT. The timing of the calculation for creating the non-uniformity correction LUT can be any timing and is not limited in particular. For example, it is possible to adopt a mode in which a test chart is outputted and correction values are calculated before carrying out a printing job; a mode in which a test chart is outputted and correction values are calculated once, each time a prescribed number of prints have been made; a mode in which a test chart is outputted and correction values are calculated before printing, when the paper type or paper size is switched; a mode in which a test chart is outputted in a margin of a recording medium and correction values are calculated, each time an image is outputted; or a mode in which correction values are calculated as described above during periodic maintenance, or when there is an instruction from a user. The data of the non-uniformity correction LUT can be updated at an appropriate timing.

When the non-uniformity correction LUT generating process shown in FIG. 14 is started, a test chart used for measuring the recorded density distribution is outputted (step S60).

Figure 15:
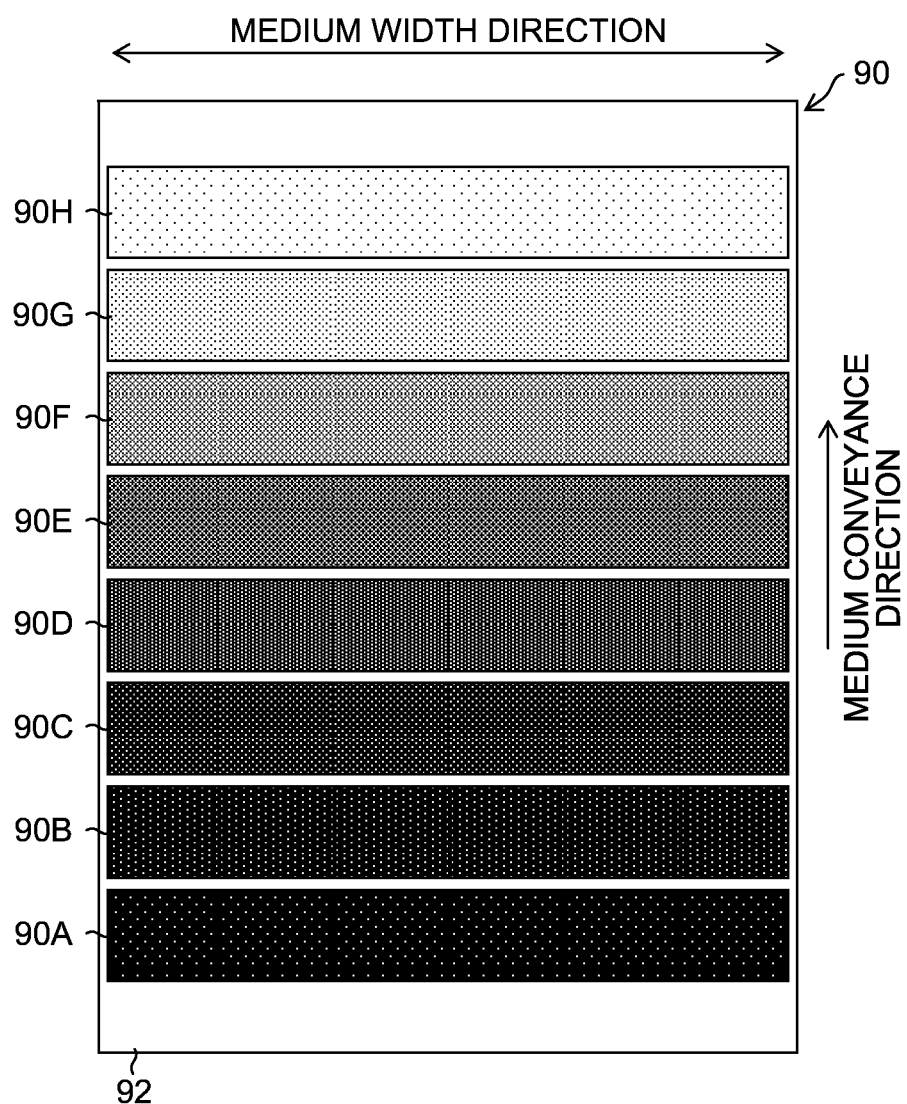
FIG. 15 is a diagram showing an example of a test chart for density measurement.

FIG. 15 is a diagram showing one example of the test chart recorded on a recording medium. The test chart 90 for the density distribution measurement shown in FIG. 15 is constituted of a plurality of band-shaped patterns 90A, 90B, 90C, 90D, 90E, 90F, 90G and 90H (here, eight patterns) which have different tone values. Each of the band-shaped patterns 90A to 90H has a long rectangular shape in the medium width direction, which is perpendicular to the medium conveyance direction. The medium width direction is the direction of the effective nozzle row in the line head, and each of the band-shaped patterns 90A to 90H is formed to a substantially uniform density in a range corresponding to the length of the nozzle row. Here, "substantially uniform density" means constant in terms of the tone instruction value (set value) when recording the pattern. By measuring the density distribution of the pattern formed on the basis of the constant tone value instruction, it is possible to ascertain the variation of the ejection characteristics of the respective nozzles corresponding to this tone value.

In the present embodiment, the example is given in which the patterns 90A to 90H having the different densities are formed in sequence of decreasing ink density from the upstream side toward the downstream side in the medium conveyance direction (from the top to the bottom in FIG. 15); however, the arrangement sequence of the patterns and the number of the band-shaped patterns (the number of steps in which the density is changed) are not limited in particular. The set tone values which record the respective band-shaped patterns can be set as appropriate and the number of band-shaped patterns can be designed as appropriate. The test charts 90 are formed for the respective colors by the C, M, Y and K heads. Furthermore, the test chart is not limited to the mode where all of the patterns 90A to 90H are recorded on one recording medium (one sheet) 92, and it is also possible to record these band-shaped patterns over a plurality of sheets of recording media.

The test chart 90 thus formed on the recording medium 92 is read in through a reading device, such as an off-line scanner, or an image reading sensor (in-line sensor) which is arranged in the paper conveyance path of the inkjet printing system 10, and read data (electronic image data) for the test chart 90 is thereby acquired. An optical density (OD) value is determined at each position in the image, from the read data, and output density data indicating the output recording density (ink density) corresponding to each position is acquired (step S62 in FIG. 14). A characteristics curve indicating the ejection characteristics (recording density characteristics) of each nozzle is acquired on the basis of the thus determined output density data and the input tone values.

Figure 16:
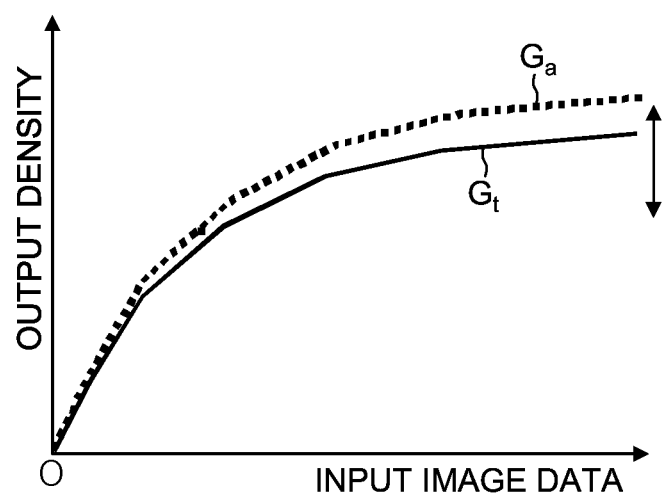
FIG. 16 is a graph showing an example of an ejection characteristics curve for a certain nozzle.

FIG. 16 is a graph showing an example of the ejection characteristics curve for a certain nozzle. The horizontal axis represents the input image data (input tone value) and the vertical axis represents the output density. The curve Gt in FIG. 16 shows a characteristics curve of the nozzle as acquired from the test chart read results. The curve Ga shown with the dotted line in FIG. 16 represents a characteristics curve (proper characteristics curve) obtained when proper ink ejection is carried out in line with design expectations. As shown in FIG. 16, the actual characteristics curve Gt of the nozzle usually deviates to some extent from the proper characteristics curve, due to manufacturing variations and other factors, and hence variations in the output density values between nozzles are observed, as shown by the up and down arrows in FIG. 16. The characteristics curves Gt of the nozzles are compared with the proper characteristics curve Ga and the table of correction values for controlling ejection of the corresponding nozzles (the ejection correction LUT) is generated in accordance with the results of this comparison (step S64 in FIG. 14).

Thereby, the ejection correction LUTs are determined for all of the nozzles, and the ejection correction LUTs for all of the nozzles are stored in the non-uniformity correction LUT DB 42 (see FIG. 1) (step S66 in FIG. 14). By the comparison of the nozzle characteristics curve Gt and the proper characteristics curve Ga, it is also possible to judge whether or not the nozzle is an ejection failure nozzle, or an ejection abnormality nozzle which is of a level that cannot be corrected. Moreover, it is also possible to form a test pattern including a so-called 1-on n-off type of line pattern, and to ascertain ejection failure nozzles, ejection volume abnormalities, depositing position errors, and the like, from the read results.

The ejection failure nozzle or the ejection abnormality nozzle which cannot be corrected is taken to be the defective nozzle which cannot be used for recording, and is handled so as not to be driven to eject during image recording. The ejection correction LUTs for the defective nozzles which have been disabled for ejection in this way do not have to be stored in the non-uniformity correction LUT DB 42.

<Overview of Method for Calculating Correction Values Corresponding to Ejection Control of Each Nozzle>

Figure 17:
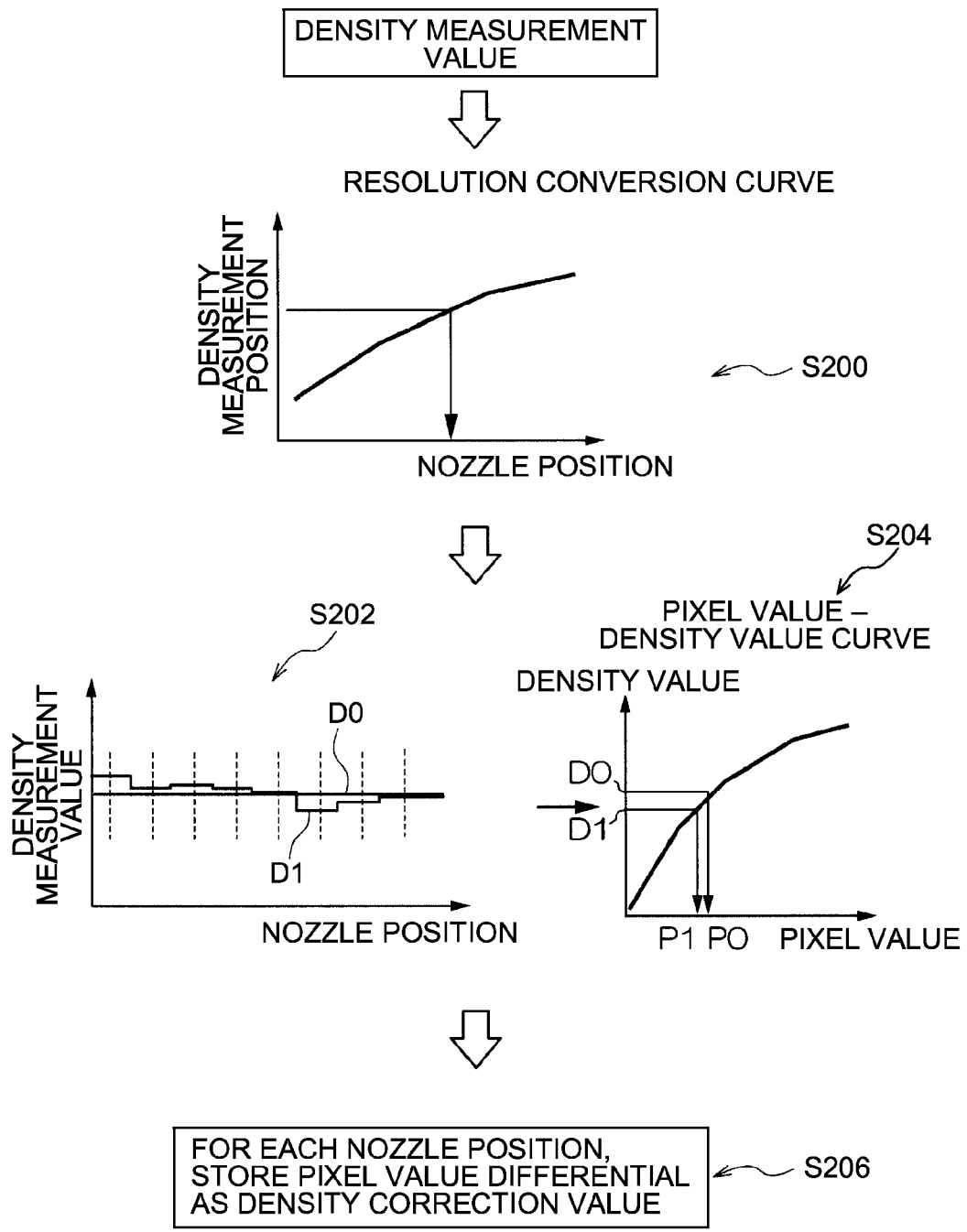
FIG. 17 is an illustrative diagram showing an example of processing for determining an ejection correction LUT for each nozzle.

FIG. 17 is an illustrative diagram showing an example of processing for determining the non-uniformity correction LUTs for the respective nozzles. As shown in S200 in FIG. 17, table data for a resolution conversion curve indicating correspondences between the pixel positions (density measurement positions) of the reading device and the nozzle positions is previously stored in a memory, and from the read results of the test chart, each of the measurement density positions (for example, pixel positions at a reading resolution of 400 dpi) in the read data (scan image) of the test chart are converted to the positions of the corresponding nozzles in the inkjet head (for example, the nozzle positions in a nozzle row which achieves a recording resolution of 1200 dpi), in accordance with the resolution conversion curve.

The thus determined nozzle positions and the density measurement values (output density values) D1 in the test chart corresponding to the nozzle positions are associated as shown in S202 in FIG. 17, and the differences between the previously determined and stored target density values D0 and the density measurement values (output density values) D1 are calculated. The target density value D0 used here is a target value for the ink density ejected from the corresponding nozzle, and can be determined appropriately according to requirements. For example, it is also possible to calculate an average density of the ink ejected from a predetermined nozzle range and to store this average density as the target density value D0.

As shown in S204 in FIG. 17, the output pixel values (the "pixel values" in S204) P1 and P0 which correspond respectively to the density measurement value (output density value) D1 and the target density value D0 (the "density value" in S204) are determined in accordance to with a pixel value/density value curve, which indicates a correspondence relationship between the pixel value and the density value that is determined previously by experimentation. The difference (P0-P1) between the output pixel values is stored as the density correction value for each nozzle position (S206).

Thereby, the correction value corresponding to the input signal value (pixel value) is determined for each nozzle, and the non-uniformity correction LUT which specifies the relationships between the output signals and the input signals is obtained for each nozzle. The procedure for generating the non-uniformity correction LUT described above is no more than an illustrative example, and it is also possible to create the non-uniformity correction LUT by another procedure.

The non-uniformity correction LUTs are a table data group of LUTs in nozzle units and have a large data volume. For example, examining the case of the system using a long line head (single-pass page-wide head) based on a single pass method capable of recording over the whole image formation range in a lengthwise direction in one paper conveyance action on a sheet of paper of the half Kiku size (636 mm×469 mm), the inkjet heads of the respective colors corresponding to the four colors of CMYK are arranged along the paper conveyance direction and in the case of the system having the recording resolution of 1200 dpi, there are approximately 30,000 nozzles in each head. This is the number of nozzles for each ink color (in the present embodiment, there are four colors), and therefore the total number of the nozzles is approximately 120,000.

If the ink ejection amount of each nozzle in the four color head group is controlled by using the LUTs, then tens of thousands of 12-bit input and 12-bit output LUTs corresponding to the total number of nozzles are handled. The data size of these non-uniformity correction LUTs is extremely large, and if the non-uniformity correction LUTs are accessed directly by the image conversion unit 34, then the calculation efficiency is poor (the calculation time is long).

In the present embodiment, it is sought to improve the efficiency of the evaluation calculation by separately creating the LUT data (non-uniformity correction thumbnail LUTs) required for calculation in the image conversion unit 34, from the non-uniformity correction LUTs.

In other words, the non-uniformity correction thumbnail LUTs can be generated separately and independently without having to coordinate the generation of the non-uniformity correction thumbnail LUTs with the evaluation calculation of the ink use amount in the image data processing unit 30. For example, when the non-uniformity correction LUTs set in the printer 18 are generated, it is possible to generate the non-uniformity correction thumbnail LUTs at the same time. Processing for creating the non-uniformity correction LUTs and the non-uniformity correction thumbnail LUTs in advance in this way is referred to as "ink ejection amount calculation pre-processing".

Figure 18:
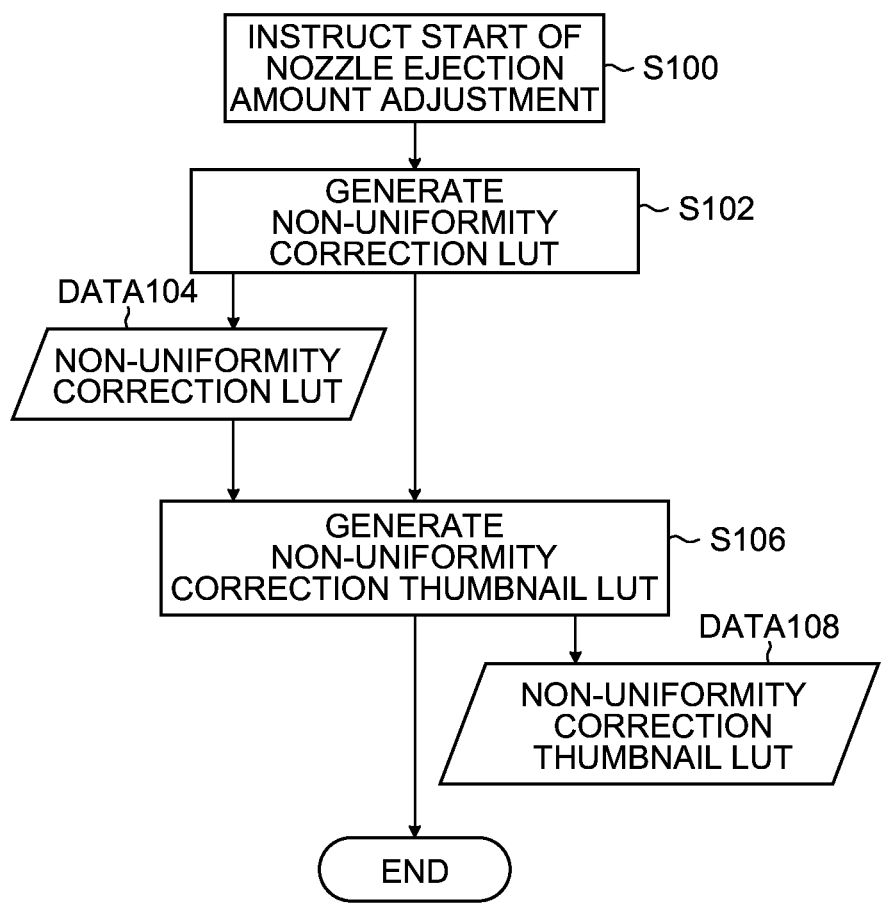
FIG. 18 is a flowchart of respective pixel processing (quantization processing)

FIG. 18 is a flowchart of the ink ejection volume calculation pre-processing. The processing flow shown in FIG. 18 is started by inputting a start instruction for nozzle ejection volume adjustment (step S100). The start instruction for nozzle ejection volume adjustment is supplied at a suitable timing, for instance, before starting executing of a printing job, when changing the paper type, or the like. This instruction signal can be generated automatically in accordance with the printing control program, or can be inputted from the input device 16 by the operator, as necessary.

When the processing flow in FIG. 18 is started, processing for generating the non-uniformity correction LUT is carried out (step S102). One example of processing for generating the non-uniformity correction LUT is as described with reference to FIGS. 14 to 17. The print results of the test pattern for density measurement are read in, the density information is acquired, the output density characteristics data for each nozzle is acquired, and the non-uniformity correction LUT is obtained by calculating the correction value for each nozzle on the basis of this data.

The data, DATA 104, of the non-uniformity correction LUTs for all of the nozzles generated by the processing step in step S102 in FIG. 18 is stored in the non-uniformity correction LUT DB 42 in the computer 12, and is also set in the non-uniformity correction processing unit 64 in the image processing board 60 of the printer 18 (see FIG. 1). Moreover, the non-uniformity correction thumbnail LUT generation processing is carried out (step S106 in FIG. 18), on the basis of the data of the non-uniformity correction LUTs (DATA 104), thereby obtaining the non-uniformity correction thumbnail LUTs (DATA 108).

A program for achieving the processing contents performed by the computer 12 described in the present embodiment can be recorded on a computer readable information storage medium or non-transitory medium, such as a CD-ROM, a magnetic disk, or another external storage device, and the program can be provided to a third party by means of the computer readable non-transitory medium, or a download service for the program can be provided through a communications circuit, such as the Internet, or the program can be provided as a service of an ASP (Application Service Provider).

Furthermore, it is also possible to adopt a mode in which all or a portion of the program for achieving the processing contents performed by the computer 12 described in the present embodiment is incorporated into an upper-level control apparatus, such as a host computer, and is employed as an operating program for a central processing unit (CPU) in the printer 18.

<Composition of Inkjet Recording Apparatus>

Next, the composition of an inkjet recording apparatus which is an embodiment of the printer 18 described with reference to FIG. 1 is described.

Figure 19:
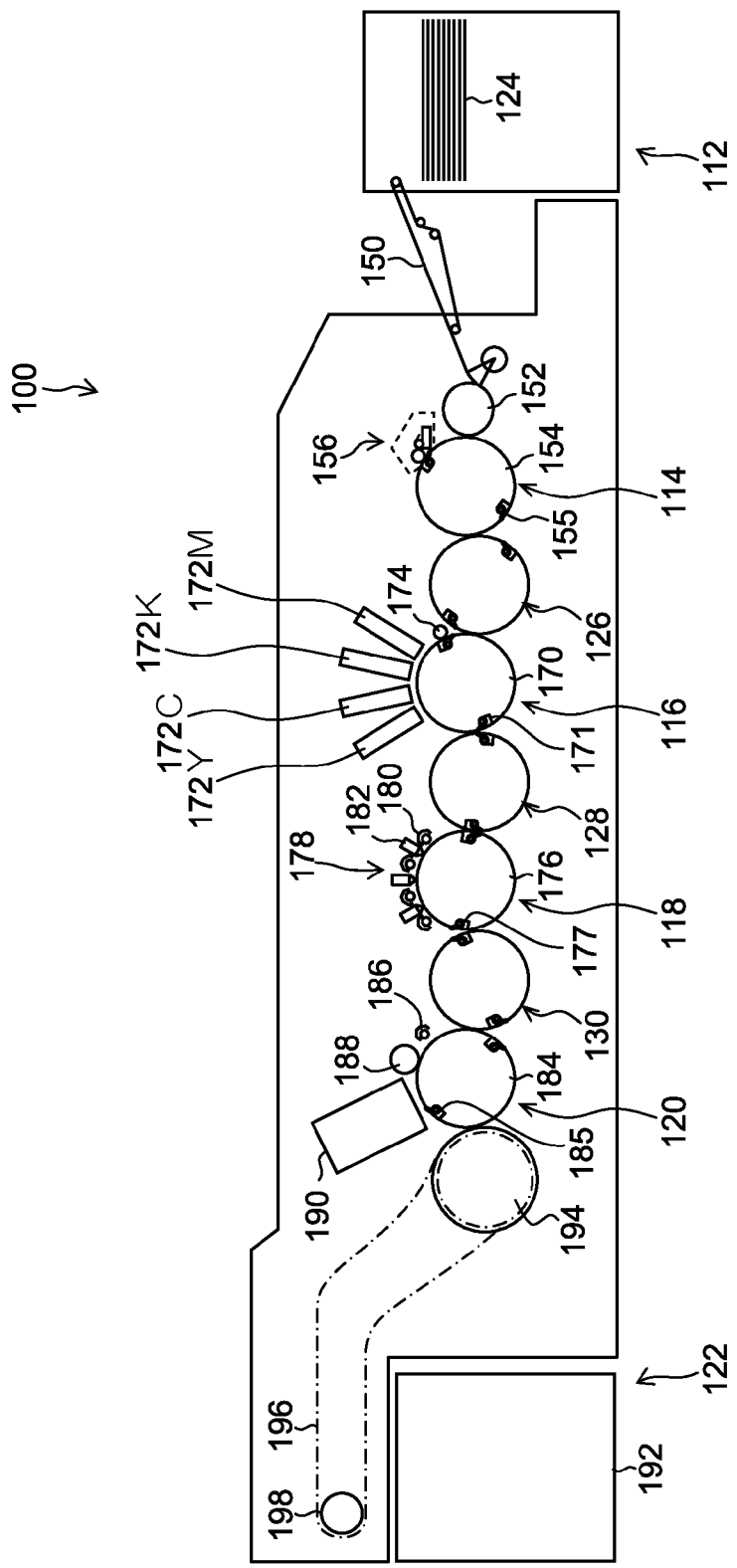
FIG. 19 is a general schematic drawing of an inkjet recording apparatus.

FIG. 19 shows the composition of the inkjet recording apparatus according to an embodiment of the present invention. The inkjet recording apparatus 100 employs a direct image formation method, which forms a desired color image by ejecting and depositing droplets of inks of a plurality of colors from inkjet heads 172M, 172K, 172C and 172Y onto a recording medium 124 (hereinafter also referred to as "paper") held on an image formation drum 170 of an image formation unit 116. The inkjet recording apparatus 100 is an image forming apparatus of a drop on-demand type employing a two-liquid reaction (aggregation) method in which an image is formed on the recording medium 124 by depositing a treatment liquid (here, an aggregating treatment liquid) on the recording medium 124 before depositing droplets of the inks, and causing the treatment liquid and the ink liquid to react together.

As shown in FIG. 19, the inkjet recording apparatus 100 includes a paper feed unit 112, a treatment liquid deposition unit 114, the image formation unit 116, a drying unit 118, a fixing unit 120 and a paper output unit 122.

<<Paper Supply Unit>>

The recording media 124 which are cut sheets of paper are stacked in the paper supply unit 112. The recording medium 124 is supplied to the treatment liquid deposition unit 114, one sheet at a time, from a paper supply tray 150 of the paper supply unit 112. The cut sheets of paper are used as the recording media 124 here, and it is also possible to adopt a composition in which paper is supplied from a continuous roll (rolled paper) and is cut to the required size.

<<Treatment Liquid Deposition Unit>>

The treatment liquid deposition unit 114 is a mechanism which deposits the treatment liquid onto a recording surface of the recording medium 124. The treatment liquid includes a coloring material aggregating agent, which aggregates the coloring material (in the present embodiment, the pigment) in the ink deposited by the image formation unit 116, and the separation of the ink into the coloring material and the solvent is promoted due to the treatment liquid and the ink making contact with each other.

The treatment liquid deposition unit 114 includes a paper supply drum 152, a treatment liquid drum 154 and a treatment liquid application device 156. The treatment liquid drum 154 has a hook-shaped gripping device (gripper) 155 arranged on the outer circumferential surface thereof, and is devised in such a manner that the leading end of the recording medium 124 can be held by gripping the recording medium 124 between the hook of the gripping device 155 and the circumferential surface of the treatment liquid drum 154. The treatment liquid drum 154 can have suction holes arranged in the outer circumferential surface thereof, which are connected to a suction device configured to perform suction through the suction holes. By this means, it is possible to hold the recording medium 124 tightly against the circumferential surface of the treatment liquid drum 154.

The treatment liquid application device 156 is disposed so as to oppose the circumferential surface of the treatment liquid drum 154. The treatment liquid application device 156 includes: a treatment liquid vessel, in which the treatment liquid is stored; an anilox roller (metering roller), which is partially immersed in the treatment liquid in the treatment liquid vessel; and a rubber roller, which transfers a dosed amount of the treatment liquid to the recording medium 124, by being pressed against the anilox roller and the recording medium 124 on the treatment liquid drum 154. According to the treatment liquid application device 156, it is possible to apply the treatment liquid to the recording medium 124 while dosing the amount of the treatment liquid. In the present embodiment, the composition is described which uses the roller-based application method, but the method is not limited to this, and it is also possible to employ various other methods, such as a spray method, an inkjet method, or the like.

The recording medium 124 onto which the treatment liquid has been deposited is transferred from the treatment liquid drum 154 to an image formation drum 170 of the image formation unit 116 through an intermediate conveyance unit 126.

<<Image Formation Unit>>

The image formation unit 116 includes the image formation drum 170, a paper pressing roller 174, and the inkjet heads 172M, 172K, 172C and 172Y. Similarly to the treatment liquid drum 154, the image formation drum 170 has a hook-shaped holding device (gripper) 171 on the outer circumferential surface thereof.

The inkjet heads 172M, 172K, 172C and 172Y are full-line type inkjet recording heads, each of which has a length corresponding to the maximum width of the image forming region on the recording medium 124, and a row of nozzles for ejecting ink arranged throughout the whole width of the image forming region is formed in the ink ejection surface of each head. The inkjet heads 172M, 172K, 172Y and 172Y are disposed so as to extend in a direction perpendicular to the conveyance direction of the recording medium 124 (the direction of rotation of the image formation drum 170).

When droplets of the corresponding colored ink are ejected and deposited from the inkjet heads 172M, 172K, 172C and 172Y to the recording surface of the recording medium 124 which is held tightly on the image formation drum 170, the deposited ink makes contact with the treatment liquid which has previously been deposited on the recording surface by the treatment liquid deposition unit 114, the coloring material (pigment) dispersed in the ink is aggregated, and a coloring material aggregate is thereby formed. Thereby, flowing of the coloring material, and the like, on the recording medium 124 is prevented and an image is formed on the recording surface of the recording medium 124.

Thus, the recording medium 124 is conveyed at a constant speed by the image formation drum 170, and it is possible to record an image on the image forming region of the recording medium 124 by performing just one operation (or one sub-scanning operation) of moving the recording medium 124 relatively to the inkjet heads 172M, 172K, 172C and 172Y in the conveyance direction.

The recording medium 124 onto which the image has been formed in the image formation unit 116 is transferred from the image formation drum 170 to a drying drum 176 of the drying unit 118 through an intermediate conveyance unit 128.

<<Drying Unit>>

The drying unit 118 is a mechanism which dries the water content contained in the solvent which has been separated by the action of aggregating the coloring material. The drying unit 118 includes the drying drum 176 and a solvent drying device 178. Similarly to the treatment liquid drum 154, the drying drum 176 has a hook-shaped holding device (gripper) 177 arranged on the outer circumferential surface thereof, in such a manner that the leading end of the recording medium 124 can be held by the holding device 177.

The solvent drying device 178 is disposed in a position opposing the outer circumferential surface of the drying drum 176, and is constituted of a plurality of halogen heaters 180 and hot air spraying nozzles 182 disposed respectively between the halogen heaters 180. The recording medium 124 on which a drying process has been carried out in the drying unit 118 is transferred from the drying drum 176 to a fixing drum 184 of the fixing unit 120 through an intermediate conveyance unit 130.

<<Fixing Unit>>

The fixing unit 120 includes the fixing drum 184, a halogen heater 186, a fixing roller 188 and an in-line sensor 190 (corresponding to the reading device). Similarly to the treatment liquid drum 154, the fixing drum 184 has a hook-shaped holding device (gripper) 185 arranged on the outer circumferential surface thereof, in such a manner that the leading end of the recording medium 124 can be held by the holding device 185.

By means of the rotation of the fixing drum 184, the recording surface of the recording medium 124 is subjected to a preliminary heating process by the halogen heater 186, a fixing process by the fixing roller 188, and inspection by the in-line sensor 190.

The fixing roller 188 is a roller member for melting self-dispersing polymer micro-particles contained in the ink and thereby causing the ink to form a film, by applying heat and pressure to the dried ink, and is composed so as to apply heat and pressure to the recording medium 124. More specifically, the fixing roller 188 is disposed so as to press against the fixing drum 184, in such a manner that a nip is created between the fixing roller 188 and the fixing drum 184. The recording medium 124 is interposed between the fixing roller 188 and the fixing drum 184 and is nipped with a prescribed nip pressure, whereby a fixing process is carried out.

Furthermore, the fixing roller 188 is constituted of a heated roller which incorporates a halogen lamp, or the like, and is controlled to a prescribed temperature.

The in-line sensor 190 is a device for reading in the image formed on the recording medium 124 (including a test chart for density measurement or a test pattern for ejection failure determination, or the like) and determining the density of the image, defects in the image, and so on. A CCD (charge-coupled device) line sensor, or the like, is employed for the in-line sensor 190.

According to the fixing unit 120, the latex particles in the thin image layer formed by the drying unit 118 are heated, pressurized and melted by the fixing roller 188, and hence the image layer can be fixed to the recording medium 124. Furthermore, the surface temperature of the fixing drum 184 is set to be not lower than 50° C. Drying is promoted by heating the recording medium 124 held on the outer circumferential surface of the fixing drum 184 from the rear surface, and therefore breaking of the image during fixing can be prevented, and furthermore, the strength of the image can be increased by the effects of the increased temperature of the image.

Instead of the ink which includes a high-boiling-point solvent and polymer micro-particles (thermoplastic resin particles), it is also possible to include a monomer which can be polymerized and cured by exposure to ultraviolet (UV) light. In this case, the inkjet recording apparatus 100 includes a UV exposure unit for exposing the ink on the recording medium 124 to UV light, instead of the heat and pressure fixing unit (fixing roller 188) based on the heat roller. In this way, if using an ink containing an active light-curable resin, such as a ultraviolet-curable resin, a device which irradiates the active light, such as a UV lamp or an ultraviolet LD (laser diode) array, is arranged instead of the fixing roller 188 for heat fixing.

<<Paper Output Unit>>

The paper output unit 122 is arranged subsequently to the fixing unit 120. The paper output unit 122 includes an output tray 192, and a transfer drum 194, a conveyance belt 196 and a tensioning roller 198 are arranged between the output tray 192 and the fixing drum 184 of the fixing unit 120 so as to oppose same. The recording medium 124 is sent to the conveyance belt 196 by the transfer drum 194 and outputted to the output tray 192. The details of the paper conveyance mechanism created by the conveyance belt 196 are not shown, but the leading end portion of the recording medium 124 after the printing is held by a gripper on a bar (not shown) which spans between the endless conveyance belts 196, and the recording medium 124 is conveyed over the output tray 192 due to the rotation of the conveyance belts 196.

Furthermore, although not shown in FIG. 19, the inkjet recording apparatus 100 according to the present embodiment includes, in addition to the composition described above: an ink storing and loading unit, which supplies the inks to the inkjet heads 172M, 172K, 172C and 172Y; a device which supplies the treatment liquid to the treatment liquid deposition unit 114; a head maintenance unit which carries out cleaning (nozzle surface wiping, purging, nozzle suctioning, and the like) of the inkjet heads 172M, 172K, 172C and 172Y; a position determination sensor, which determines the position of the recording medium 124 in the paper conveyance path; a temperature sensor which determines the temperature of the respective units of the inkjet recording apparatus 100, and the like.

<Composition of Inkjet Head>

Next, the structure of the inkjet head is described. The inkjet heads 172M, 172K, 172C and 172Y have a common structure, and therefore these heads are represented by a head denoted with reference numeral 250 below.

Figure 20A:
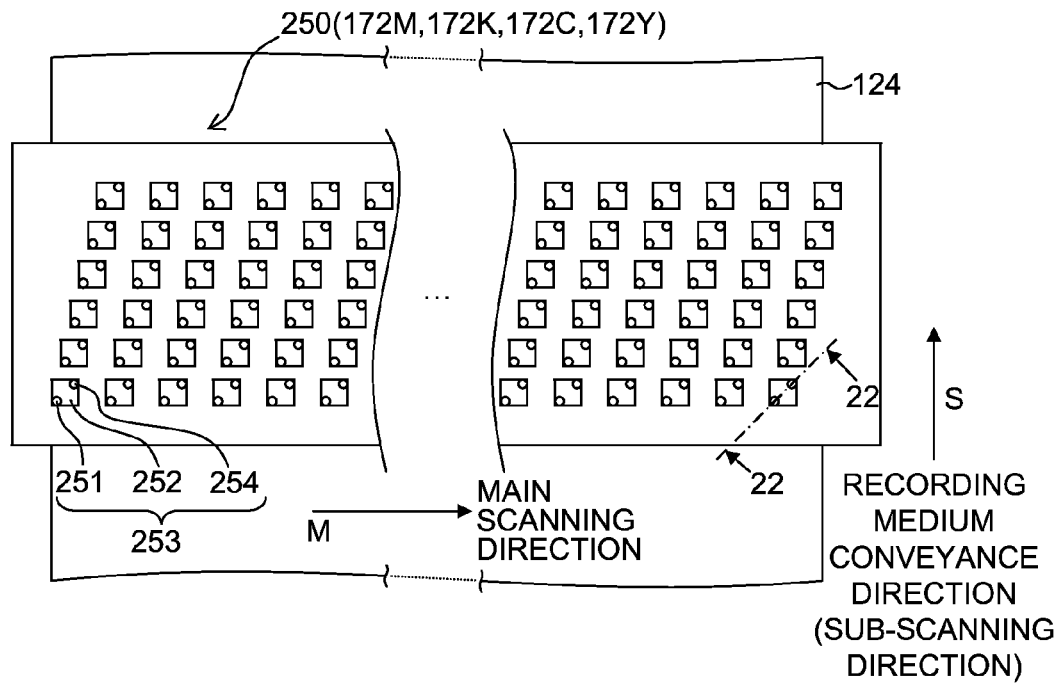
FIG. 20A is a plan view perspective diagram showing an example of the structure of a head.
Figure 20B:
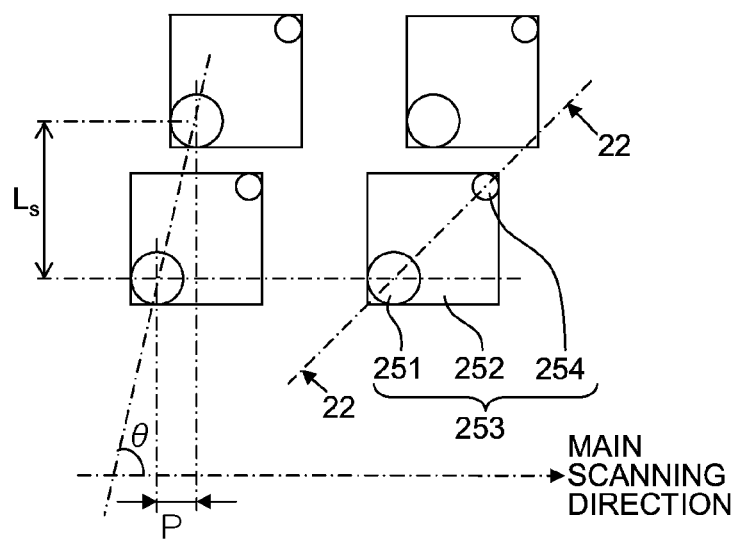
FIG. 20B is a partial enlarged view of same.
Figure 21A:
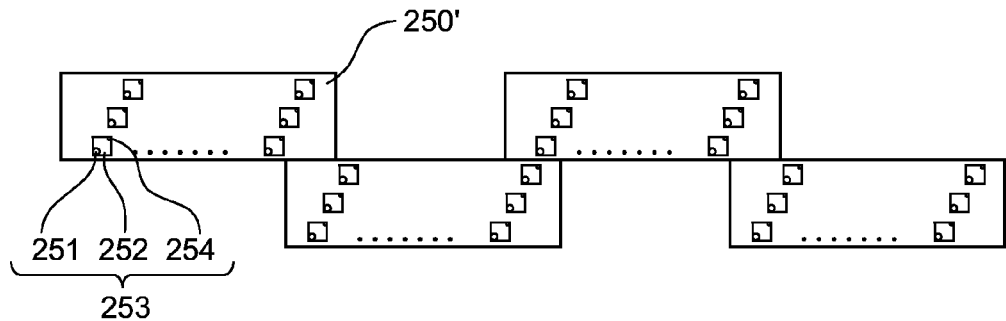
FIGS. 21A and 21B are plan view perspective diagrams showing further examples of the structure of the head.
Figure 21B:
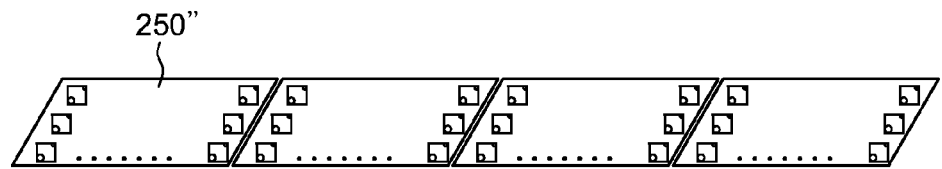
Figure 22:
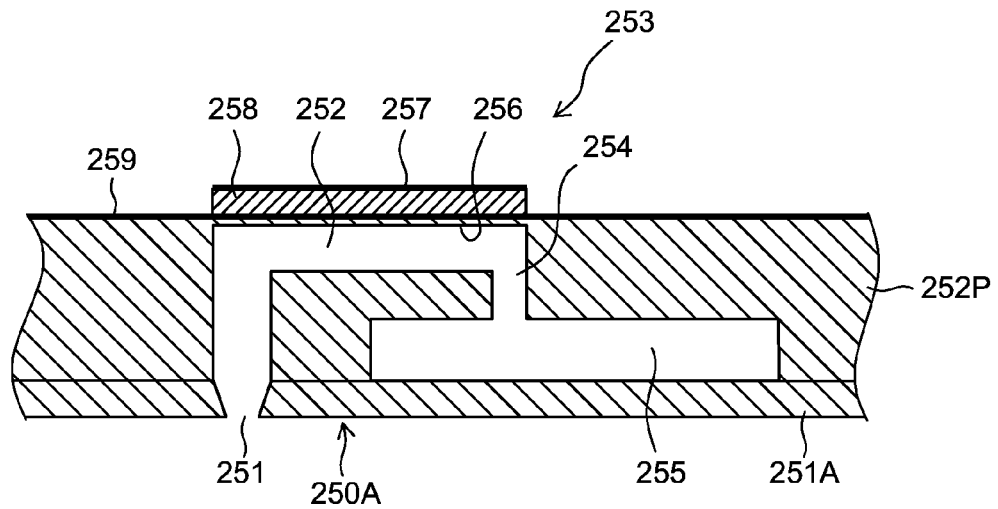
FIG. 22 is a cross-sectional diagram taken along line 22-22 in FIGS. 20A and 20B.

FIG. 20A is a plan view perspective diagram showing an example of the structure of the head 250, and FIG. 20B is a partial enlarged view of same. FIGS. 21A and 21B are plan view perspective diagrams showing other examples of the structure of the head 250. FIG. 22 is a cross-sectional diagram taken along line 22-22 in FIGS. 20A and 20B and showing the inner composition of a droplet ejection element of one channel (an ink chamber unit corresponding to one nozzle 251).

As shown in FIG. 20A, the head 250 according to the present embodiment has a structure in which a plurality of ink chamber units (droplet ejection elements) 253 are arranged two-dimensionally in a matrix configuration, each ink chamber unit including a nozzle 251 forming an ink ejection port, and a pressure chamber 252 corresponding to the nozzle 251, and the like, whereby a high density is achieved in the effective nozzle density (projected nozzle density) obtained by projecting (by orthogonal reflection) the nozzles to an alignment in the lengthwise direction of the head (the direction perpendicular to the paper conveyance direction), that is, a small pitch is achieved in the effective nozzle pitch (projected nozzle pitch).

The mode of composing the nozzle row having the length equal to or greater than the full width of the image formation region of the recording medium 124 in the direction (the main scanning direction, the direction indicated with an arrow M), which is substantially perpendicular to the feed direction of the recording medium 124 (the sub-scanning direction, the direction indicated with an arrow S) is not limited to the present example. For example, instead of the composition in FIG. 20A, it is possible to adopt a mode in which a line head having a nozzle row of a length corresponding to the full width of the recording medium 124 is composed by joining together in a staggered configuration short head modules 250' in which a plurality of nozzles 251 are arranged in a two-dimensional arrangement, as shown in FIG. 21A, or a mode in which head modules 250" are joined together in an alignment in one row, as shown in FIG. 21B.

Each of the pressure chambers 252 arranged to correspond to the respective nozzles 251 has a substantially square planar shape (see FIGS. 20A and 20B), an outlet port to the nozzle 251 is arranged in one corner on a diagonal of the pressure chamber, and an ink inlet port (supply port) 254 is arranged in the other corner thereof. The shape of the pressure chambers 252 is not limited to that of the present example and various modes are possible in which the planar shape is a quadrilateral shape (rhombic shape, rectangular shape, or the like), a pentagonal shape, a hexagonal shape, or other polygonal shape, or a circular shape, an elliptical shape, or the like.

As shown in FIG. 22, the head 250 has a structure in which a nozzle plate 251A in which the nozzles 251 are formed, a flow channel plate 252P in which flow channels such as pressure chambers 252 and a common flow channel 255, and the like, are formed, and so on, are layered and bonded together.

The flow channel plate 252P is a flow channel forming member which constitutes side wall portions of the pressure chambers 252 and in which a supply port 254 is formed to serve as a restricting part (most constricted portion) of an individual supply channel for guiding the ink to each pressure chamber 252 from the common flow channel 255. For the sake of the description, a simplified view is given in FIG. 22, but the flow channel plate 252P has a structure formed by layering together one or a plurality of substrates.

The nozzle plate 251A and the flow channel plate 252P can be processed into a desired shape by a semiconductor manufacturing process using silicon as a material.

The common flow channel 255 is connected to an ink tank (not shown), which is a base tank that supplies the ink, and the ink supplied from the ink tank is supplied through the common flow channel 255 to the pressure chambers 252.

Piezoelectric actuators 258 each including individual electrodes 257 are bonded to a diaphragm 256, which constitutes a portion of the faces of the pressure chambers 252 (the ceiling face in FIG. 22). The diaphragm 256 in the present embodiment is made of silicon (Si) having a nickel (Ni) conducting layer, which functions as a common electrode 259 corresponding to the lower electrodes of the piezoelectric actuators 258, and serves as a common electrode for the piezoelectric actuators 258 which are arranged so as to correspond to the respective pressure chambers 252. A mode is also possible in which a diaphragm is made from a non-conductive material, such as resin, in which case, a common electrode layer made of a conductive material, such as metal, is formed on the surface of the diaphragm material. Furthermore, the diaphragm which also serves as the common electrode can be made of a metal (conductive material), such as stainless steel (SUS), or the like.

When a drive voltage is applied to the individual electrode 257, the piezoelectric actuator 258 deforms, thereby changing the volume of the corresponding pressure chamber 252. This causes a pressure change which results in the ink in the pressure chamber 252 being ejected from the nozzle 251. When the piezoelectric actuator 258 returns to its original position after the ink ejection, the pressure chamber 252 is replenished with new ink from the common flow channel 255 through the supply port 254.

The high-density nozzle head of the present embodiment is achieved by arranging the plurality of ink chamber units 253 having the above-described structure in a lattice configuration according to a prescribed arrangement pattern in a row direction following the main scanning direction and an oblique column direction having a prescribed non-perpendicular angle θ with respect to the main scanning direction, as shown in FIG. 20B. If the pitch between adjacent nozzles in the sub-scanning direction is taken to be $L_s$, then this matrix arrangement can be treated as equivalent to a configuration where the nozzles 251 are effectively arranged in a single straight line at a uniform pitch of $P=L_s/\tan\theta$ apart in the main scanning direction.

In implementing the present invention, the mode of arrangement of the nozzles 251 in the head 250 is not limited to the embodiments shown in the drawings, and it is possible to adopt various nozzle arrangements. For example, it is possible to use a single line linear nozzle arrangement, such as a V-shaped nozzle arrangement, or a zig-zag shape (W shape, or the like) in which a V-shaped nozzle arrangement is repeated.

<Correspondences Between the Terminology of the Embodiments and the Terminology of the Claims>

A combination of the computer 12, the monitor 14 and the input device 16 can correspond to an "ink use amount evaluation apparatus". The image input interface unit 22 can correspond to an "image input device", and the image data DB 24 can correspond to an "image data storage device". The tone conversion LUT can correspond to a "first look-up table" and the tone conversion LUT DB 40 can correspond to a "first look-up table storage device". The non-uniformity correction LUT can correspond to a "second look-up table" and the non-uniformity correction LUT DB 42 can correspond to a "second look-up table storage device". The non-uniformity correction thumbnail LUT can correspond to a "third look-up table" and the non-uniformity correction thumbnail LUT generation unit 56 can correspond to a "third look-up table generation device". The image reduction processing unit 32, the image conversion unit 34, the ink amount data calculation unit 36 and the image analysis unit 38 can correspond respectively to an "image reduction processing device", an "image conversion device", an "ink amount distribution data calculation device" and an "image analysis device". The composition which obtains density information from the read data of the test chart for density measurement can correspond to a "density information acquisition device". The LUT generation unit 54 can correspond to a "second look-up table generation device". The inkjet printing system 10 can correspond to an "inkjet apparatus". The image processing board 60 can correspond to an "image processing device", and a combination of the system controller 50 and the image processing board 60 can correspond to an "ejection control device".

Modification Examples

In the embodiments described above, the inkjet recording apparatus based on the method which forms an image by ejecting and depositing ink droplets directly onto the recording medium 124 (direct recording method) has been described, but the application of the present invention is not limited to this, and the present invention can also be applied to an image forming apparatus of an intermediate transfer type, which provisionally forms an image (primary image) on an intermediate transfer body, and then performs final image formation by transferring the image onto recording paper in a transfer unit.

<Device for Causing Relative Movement of Head and Paper>

In the embodiments described above, the example is given in which the recording medium is conveyed with respect to the stationary heads, but in implementing the present invention, it is also possible to move the heads with respect to a stationary recording medium (image formation receiving medium).

<Recording Medium>

The "recording medium" is a general term for a medium on which dots are recorded by droplets ejected from an inkjet head, and this includes various terms, such as print medium, recorded medium, image formed medium, image receiving medium, ejection receiving medium, and the like. In implementing the present invention, there are no particular restrictions on the material or shape, or other features, of the recording medium, and it is possible to employ various different media, irrespective of their material or shape, such as continuous paper, cut paper, seal paper, OHP sheets or other resin sheets, film, cloth, nonwoven cloth, a printed substrate on which a wiring pattern, or the like, is formed, or a rubber sheet.

In the embodiments described above, the example is described which restricts the ink use amount from the viewpoint of paper deformation due to cockling, but in the evaluation of the ink use amount, the issue of whether or not the recording medium (paper) deforms due to absorbing water in the ink is not an absolutely necessary condition. More specifically, even in a case of using a non-permeable medium into which the ink liquid does not permeate (or a low-permeability medium which has low permeability), it is possible to ascertain the ink use amount accurately by applying the present invention.

<Ejection Method>

The device which generates pressure (ejection energy) for ejection in order to eject droplets from the nozzles of the inkjet head is not limited to a piezoelectric actuator (piezoelectric element). Apart from a piezoelectric element, it is also possible to employ pressure generating elements (ejection energy generating elements) of various kinds, such as a heater (heating element) in a thermal method (a method which ejects ink by using the pressure produced by film boiling caused by heat from the heater), or various actuators based on other methods. A corresponding energy generating element is arranged in the flow channel structure in accordance with the ejection method of the head.

Apparatus Application Examples

In the embodiments described above, application to the inkjet recording apparatus for graphic printing has been described, but the scope of application of the present invention is not limited to this example. For example, the present invention can also be applied widely to inkjet systems which obtain various shapes or patterns using liquid function material, such as a wire printing apparatus which forms an image of a wire pattern for an electronic circuit, manufacturing apparatuses for various devices, a resist printing apparatus which uses resin liquid as a functional liquid for ejection, a color filter manufacturing apparatus, a fine structure forming apparatus for forming a fine structure using a material for material deposition, or the like.

The term "ink" can be interpreted as a broad term for a liquid (functional liquid) which is ejected from a liquid ejection head based on an inkjet method, and is not limited to a color ink (an ink containing a coloring material) which is used for graphic printing. A liquid containing functional material, such as an ink containing fine particles, is included in the interpretation of the term "ink".

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An ink use amount evaluation apparatus, comprising:
    an image input device configured to receive original image data;
    an image reduction processing device which is configured to generate reduced image data from the original image data, the reduced image data having a resolution lower than a resolution of the original image data;
    a first look-up table storage device which is configured to store a first look-up table specifying an input/output relationship for performing tone conversion of the reduced image data;
    a second look-up table storage device which is configured to store second look-up tables respectively specifying signal conversion relationships for correcting ink ejection amounts of nozzles in a liquid ejection head which are configured to eject ink in accordance with the original image data;
    a third look-up table generation device which is configured to compile the second look-up tables assigned respectively to the nozzles into data corresponding to prescribed widths corresponding to the resolution of the reduced image data to thereby generate a third look-up table from the second look-up tables assigned respectively to the nozzles, the third look-up table specifying signal conversion relationships for correcting signal values of the reduced image data for each of the prescribed widths corresponding to the resolution of the reduced image data;
    an image conversion device which is configured to carry out conversion processing using the first and third look-up tables on the reduced image data to generate converted reduced image data;
    an ink amount distribution data calculation device which is configured to generate ink amount distribution data from the converted reduced image data, the ink amount distribution data indicating a distribution of an ink amount used in image formation of image contents corresponding to the reduced image data; and
    an image analysis device which is configured to analyze the ink amount distribution data to judge whether an amount of ink exceeding a specific value is to be used or not.

2. The ink use amount evaluation apparatus as defined in claim 1, wherein the third look-up table generation device is configured to compile the second look-up tables in a range corresponding to a width per pixel at the resolution of the reduced image data, into the third look-up table.

3. The ink use amount evaluation apparatus as defined in claim 1, further comprising:
    a density information acquisition device which is configured to acquire output density data indicating recording density characteristics for the nozzles in the liquid ejection head; and
    a second look-up table generation device which is configured to generate the second look-up tables by calculating density correction values for the nozzles, respectively, from the output density data.

4. The ink use amount evaluation apparatus as defined in claim 3, wherein when the second look-up table generation device newly generates the second look-up tables, the third look-up table generation device newly generates the third look-up table from the newly generated second look-up tables, and the image conversion device uses the newly generated third look-up table.

5. The ink use amount evaluation apparatus as defined in claim 4, wherein when the second look-up table generation device newly generates the second look-up tables, the third look-up table generation device newly generates the third look-up table immediately after the newly generated second look-up tables are generated.

6. The ink use amount evaluation apparatus as defined in claim 1, wherein the ink amount distribution data has a signal bit depth of not smaller than 16 bits.

7. The ink use amount evaluation apparatus as defined in claim 1, wherein the image analysis device is configured to apply a filter of a size corresponding to a prescribed surface area in an image to the ink amount distribution data and to judge whether the amount of ink exceeding the specific value is to be used or not in the prescribed surface area.

8. The ink use amount evaluation apparatus as defined in claim 1, further comprising a display device which is configured to perform a display corresponding to a result of analysis obtained by the image analysis device.

9. The ink use amount evaluation apparatus as defined in claim 8, further comprising:
    an image data storage device which is configured to store image data acquired from the image input device,
    wherein the display device is configured to perform a display corresponding to a list of images stored in the image data storage device along with a display of an ink use amount status of each of the stored images in accordance with the result of analysis obtained by the image analysis device.

10. The ink use amount evaluation apparatus as defined in claim 9, wherein when at least one of the first and second look-up tables is updated, the ink use amount for the stored image is recalculated to reflect this updated look-up table and the display on the display device is updated in accordance with the recalculated result.

11. The ink use amount evaluation apparatus as defined in claim 8, further comprising:
an image data storage device which is configured to store image data acquired from the image input device,
wherein the display device is configured to perform a display corresponding to a list of images stored in the image data storage device as sets of classified job groups which are classified in accordance with an ink use amount status of each of the stored images in accordance with the result of analysis obtained by the image analysis device.

12. The ink use amount evaluation apparatus as defined in claim 1, wherein the ink amount distribution data calculation device is configured to determine an ink amount per pixel in the reduced image data in accordance with a halftone table which specifies a relationship between signal values in the reduced image data and a dot size-specific ratio in a dot arrangement obtained by halftone processing corresponding to the signal values, and information about ink droplet volumes of dot sizes.

13. The ink use amount evaluation apparatus as defined in claim 1, wherein the image reduction processing device is configured to average pixels of the original image data corresponding to coordinates in a range corresponding to a size per pixel of the reduced image data to specify signal values per pixel of the reduced image data, so as to generate the reduced image data.

14. The ink use amount evaluation apparatus as defined in claim 1, wherein the image reduction processing device is configured to obtain a sum value by summing pixels of the original image data corresponding to coordinates in a range corresponding to a size per pixel of the reduced image data, and to carry out processing for assigning the sum value to any bit depth value of the reduced image data, so as to generate the reduced image data.

15. The ink use amount evaluation apparatus as defined in claim 1, wherein the reduced image data has a signal bit depth of not smaller than 16 bits.

16. An inkjet apparatus, comprising:
the ink use amount evaluation apparatus as defined in claim 1;
a medium conveyance device which is configured to move a recording medium relatively to the liquid ejection head;
an image processing device which is configured to generate binary or multiple-value data by applying signal processing to inputted image data in accordance with the first and second look-up tables and a halftone table; and
an ejection control device which is configured to control ejection from the nozzles of the liquid ejection head in accordance with the data generated by the image processing device.

17. The inkjet apparatus as defined in claim 16, wherein the liquid ejection head is a head based on a single-pass method which records an image by one relative movement with respect to the recording medium.

18. The ink use amount evaluation apparatus as defined in claim 1, wherein:
the reduced image data include color signal values of cyan, magenta, yellow and black; and
the first look-up table includes color-specific one-dimensional look-up tables configured to be used for conversion of inputted color signal values of cyan, magenta, yellow and black to outputted color signal values of cyan, magenta, yellow and black, respectively.

19. The ink use amount evaluation apparatus as defined in claim 1, wherein the ink amount distribution data calculation device is configured to generate the ink amount distribution data from the converted reduced image data without performing halftone processing of the converted reduced image data.

20. An ink use amount evaluation method, comprising:
an image input step of acquiring original image data;
an image reduction processing step of generating reduced image data from the original image data, the reduced image data having a resolution lower than a resolution of the original image data;
a first look-up table storage step of storing a first look-up table specifying an input/output relationship for performing tone conversion of the reduced image data;
a second look-up table storage step of storing second look-up tables respectively specifying signal conversion relationships for correcting ink ejection amounts of nozzles in a liquid ejection head which are configured to eject ink in accordance with the original image data;
a third look-up table generation step of compiling the second look-up tables assigned respectively to the nozzles into data corresponding to prescribed widths corresponding to the resolution of the reduced image data and thereby generating a third look-up table from the second look-up tables assigned respectively to the nozzles, the third look-up table specifying signal conversion relationships for correcting signal values of the reduced image data for each of prescribed widths corresponding to the resolution of the reduced image data;
an image conversion step of carrying out conversion processing using the first and third look-up tables on the reduced image data to generate converted reduced image data;
an ink amount distribution data calculation step of generating ink amount distribution data from the converted reduced image data, the ink amount distribution data indicating a distribution of an ink amount used in image formation of image contents corresponding to the reduced image data; and
an image analysis step of analyzing the ink amount distribution data to judge whether an amount of ink exceeding a specific value is to be used or not.

21. A computer readable non-transitory medium storing instructions causing a computer to perform the steps of the ink use amount evaluation method as defined in claim 20.

* * * * *